(12) United States Patent
Yajima et al.

(10) Patent No.: US 11,670,777 B2
(45) Date of Patent: Jun. 6, 2023

(54) THIN FILM FORMING COMPOSITION FOR ENERGY STORAGE DEVICE ELECTRODES

(71) Applicant: Nissan Chemical Corporation, Tokyo (JP)

(72) Inventors: Mari Yajima, Funabashi (JP); Takuma Nagahama, Funabashi (JP); Takahiro Kaseyama, Funabashi (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 17/802,771

(22) PCT Filed: Feb. 24, 2021

(86) PCT No.: PCT/JP2021/006734
§ 371 (c)(1),
(2) Date: Aug. 26, 2022

(87) PCT Pub. No.: WO2021/172308
PCT Pub. Date: Sep. 2, 2021

(65) Prior Publication Data
US 2023/0099896 A1    Mar. 30, 2023

(30) Foreign Application Priority Data

Feb. 27, 2020    (JP) .............................. JP2020-032072

(51) Int. Cl.
| | | |
|---|---|---|
| H01M 4/13 | (2010.01) | |
| H01M 4/66 | (2006.01) | |
| C09D 7/61 | (2018.01) | |
| C09D 7/20 | (2018.01) | |
| C09D 7/45 | (2018.01) | |
| C09D 7/63 | (2018.01) | |
| C09D 123/22 | (2006.01) | |
| C09D 135/02 | (2006.01) | |
| H01G 11/68 | (2013.01) | |
| H01G 11/28 | (2013.01) | |
| H01G 11/32 | (2013.01) | |
| C09D 5/24 | (2006.01) | |
| C08K 5/18 | (2006.01) | |
| C08K 3/04 | (2006.01) | |

(52) U.S. Cl.
CPC .............. *H01M 4/667* (2013.01); *C09D 5/24* (2013.01); *C09D 7/20* (2018.01); *C09D 7/45* (2018.01); *C09D 7/61* (2018.01); *C09D 7/63* (2018.01); *C09D 123/22* (2013.01); *C09D 135/02* (2013.01); *H01G 11/28* (2013.01); *H01G 11/32* (2013.01); *H01G 11/68* (2013.01); *H01M 4/13* (2013.01); *H01M 4/663* (2013.01); *H01M 4/668* (2013.01); *C08K 3/041* (2017.05); *C08K 5/18* (2013.01); *C08K 2201/001* (2013.01); *C08K 2201/011* (2013.01)

(58) Field of Classification Search
CPC .................................... H01M 4/13; C08K 5/18
See application file for complete search history.

(56) References Cited

U.S. PATENT DOCUMENTS

| | | |
|---|---|---|
| 2015/0203722 A1 | 7/2015 | Yoshida |
| 2015/0228982 A1 | 8/2015 | Shibano et al. |
| 2016/0200850 A1 | 7/2016 | Hatanaka et al. |

FOREIGN PATENT DOCUMENTS

| | | |
|---|---|---|
| JP | 9-97625 A | 4/1997 |
| JP | 11-149916 A | 6/1999 |
| JP | 2000-11991 A | 1/2000 |
| JP | 2006-351316 A | 12/2006 |
| JP | 2010-116475 A | 5/2010 |
| JP | 2013-229187 A | 11/2013 |
| WO | WO 2014/042080 A1 | 3/2014 |
| WO | WO 2014/051043 A1 | 4/2014 |
| WO | WO 2015/029949 A1 | 3/2015 |

OTHER PUBLICATIONS

International Search Report (PCT/ISA/210) issued for PCT/JP2021/006734, dated Apr. 27, 2021.
Written Opinion of the International Searching Authority (PCT/ISA/237) issued for PCT/JP2021/006734, dated Apr. 27, 2021.

*Primary Examiner* — Khanh T Nguyen
(74) *Attorney, Agent, or Firm* — Birch, Stewart, Kolasch & Birch, LLP

(57) ABSTRACT

The present invention provides a thin film forming composition for energy storage device electrodes, said composition containing a conductive carbon material, a dispersant, a solvent and a polymer that has a partial structure represented by formula (P1) in a side chain.

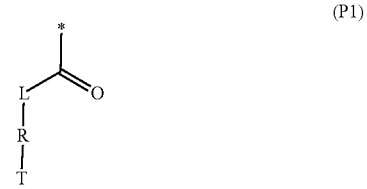

(P1)

(In the formula, L represents —O— or —NH—; R represents an alkylene group having from 1 to 20 carbon atoms; T represents a substituted or unsubstituted amino group, a nitrogen-containing heteroaryl group having from 2 to 20 carbon atoms or a nitrogen-containing aliphatic heterocyclic group having from 2 to 20 carbon atoms; and * represents a bonding hand.)

12 Claims, No Drawings

THIN FILM FORMING COMPOSITION FOR ENERGY STORAGE DEVICE ELECTRODES

TECHNICAL FIELD

The present invention relates to a thin film forming composition for energy storage device electrodes.

BACKGROUND ART

In recent years, with the demand for miniaturization, weight reduction, and high functionality of portable electronic devices such as smartphones, digital cameras, and portable game machines, development of high-performance batteries has been actively promoted, and the demand for secondary batteries that can be repeatedly used by charging has been greatly increased. Among secondary batteries, lithium ion secondary batteries are currently most actively developed because they have high energy density and high voltage, and are free of a memory effect at the time of charge and discharge. In recent years, development of electric vehicles also has been actively promoted in response to environmental problems, and secondary batteries as a power source thereof have been required to have further high performance.

A lithium ion secondary battery has a structure in which a positive electrode and a negative electrode that are capable of intercalating and deintercalating lithium, and a separator interposed therebetween are housed in a container, and an electrolyte solution (in the case of a lithium ion polymer secondary battery, a gel-like or all-solid-state electrolyte instead of a liquid electrolyte solution) fills the container.

The positive electrode and the negative electrode are generally manufactured by applying a composition including an active material capable of intercalating and deintercalating lithium, a conductive material mainly including a carbon material, and a polymer binder to a current collector such as a copper foil or an aluminum foil. The binder is used for bonding the active material, the conductive material, and the metal foil to each other, and examples of the commercially available binder include fluorine-based resins soluble in N-methylpyrrolidone (NMP), such as polyvinylidene fluoride (PVdF), and aqueous dispersions of an olefin-based polymer.

However, the adhesiveness of the binder to the current collector is not sufficient, so that during a manufacturing process such as an electrode cutting process or winding process, a part of the active material or the conductive material is stripped off and separated from the current collector, and as a result, a minute short circuit or variation in battery capacity may be caused. Furthermore, a long-term use causes swelling of the binder by the electrolyte solution and causes volume change of the electrode mixture accompanying the volume change of the active material due to lithium intercalation and deintercalation, resulting in a problem of battery capacity deterioration caused by an increase in the contact resistance between the electrode mixture and the current collector or by stripping and separation of a part of the active material or the conductive material from the current collector, and resulting in a problem of the safety.

As an attempt to solve the above problems, a method in which a conductive undercoat layer is interposed between a current collector and an electrode mixture layer has been developed as a technique of reducing the resistance of a battery by increasing the adhesion between the current collector and the electrode mixture layer to reduce the contact resistance. For example, Patent Document 1 discloses a technique in which a conductive layer including carbon as a conductive filler is disposed as an undercoat layer between a current collector and an electrode mixture layer. Patent Document 1 shows that by using the composite current collector including the undercoat layer, the contact resistance between the current collector and the electrode mixture layer can be reduced, a decrease in the capacity at the time of fast discharge can be suppressed, and deterioration of the battery can also be suppressed. Patent Documents 2 and 3 also disclose a similar technique. Patent Documents 4 and 5 disclose an undercoat layer including a carbon nanotube (hereinafter, also abbreviated as CNT) as a conductive filler.

However, in order to further improve the performance of secondary batteries, it is required to further improve the adhesion between the current collector and the electrode mixture layer.

PRIOR ART DOCUMENTS

Patent Documents

Patent Document 1: JP-A H09-097625
Patent Document 2: JP-A 2000-011991
Patent Document 3: JP-A H11-149916
Patent Document 4: WO 2014/042080
Patent Document 5: WO 2015/029949

SUMMARY OF INVENTION

Technical Problem

The present invention has been made in view of such circumstances, and an object of the present invention is to provide a thin film forming composition for energy storage device electrodes, that can be suitably used for forming a conductive thin film, and particularly in an energy storage device, can provide an undercoat layer that improves adhesion between a current collector and an electrode mixture layer and exhibits an effect of reducing the resistance and an effect of suppressing an increase in the resistance.

Solution to Problem

As a result of intensive studies to achieve the above object, the present inventors have found that a composition including a conductive carbon material, a dispersant, a solvent, and a polymer having a pendant chain having a specific partial structure can provide an undercoat layer that improves adhesion between a current collector and an electrode mixture layer and exhibits an effect of reducing the resistance and an effect of suppressing an increase in the resistance, and thus the present invention has been completed.

That is, the present invention provides a thin film forming composition for energy storage device electrodes as described below.

1. A thin film forming composition for energy storage device electrodes, including a conductive carbon material, a dispersant, a solvent, and a polymer having a pendant chain having a partial structure of formula (P1) described below:

[Chem. 1]

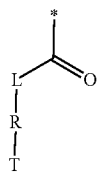
(P1)

wherein L represents —O— or —NH—, R represents an alkylene group having 1 to 20 carbon atoms, T represents a substituted or unsubstituted amino group, a nitrogen-containing heteroaryl group having 2 to 20 carbon atoms, or a nitrogen-containing aliphatic heterocyclic group having 2 to 20 carbon atoms, and * represents a bonding site.

2. The thin film forming composition for energy storage device electrodes of 1 above, wherein the partial structure of formula (P1) has any one of formulas (P1-1) to (P1-3) described below:

[Chem. 2]

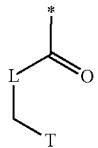
(P1-1)

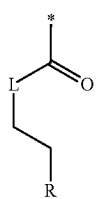
(P1-2)

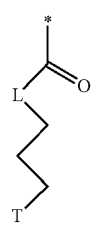
(P1-3)

wherein L, T, and * are as described above.

3. The thin film forming composition for energy storage device electrodes of 2 above, wherein the partial structure of formula (P1) has any one of formulas (P2-1) to (P2-3) described below:

[Chem. 3]

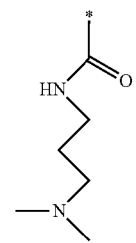
(P2-1)

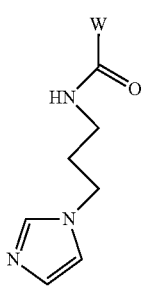
(P2-2)

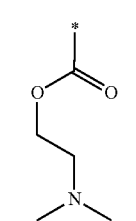
(P2-3)

wherein * is as described above.

4. The thin film forming composition for energy storage device electrodes of 1 above, wherein the polymer includes repeating units of formula (C1-1) or (C1-2) described below:

[Chem. 4]

(C1-1)

(C1-2)

wherein $R^{c1}$ and $R^{c2}$ each independently represent a hydrogen atom or an alkyl group having 1 to 20 carbon atoms, $R^m$ represents a hydrogen atom or a methyl group, n represents a natural number, and L, R, T, and * are as described above.

5. The thin film forming composition for energy storage device electrodes of any one of 1 to 4 above, wherein the solvent includes one or more selected from the group consisting of water and hydrophilic solvents.

6. The thin film forming composition for energy storage device electrodes of any one of 1 to 5 above, wherein the dispersant includes a pendant oxazoline group-containing polymer or a triarylamine-based highly branched polymer.

7. The thin film forming composition for energy storage device electrodes of any one of 1 to 6 above, further including a crosslinking agent.

8. An undercoat layer including a thin film obtained from the thin film forming composition for energy storage device electrodes of any one of 1 to 7 above.

9. A composite current collector for energy storage device electrodes, including the undercoat layer of 8 above.

10. An electrode for energy storage devices, including the composite current collector for energy storage device electrodes of 9 above.

11. An energy storage device including the electrode for energy storage devices of 10 above.

12. The energy storage device of 11 above, being a lithium ion battery.

Advantageous Effects of Invention

The thin film forming composition for energy storage device electrodes of the present invention is suitable as a composition for formation of an undercoat layer that bonds a current collector constituting an energy storage device electrode and an electrode mixture layer together, and if the undercoat layer is formed on the current collector using the composition, the adhesion between the electrode mixture and the current collector can be improved, and the characteristics of the resulting battery can be improved.

DESCRIPTION OF EMBODIMENTS

The thin film forming composition for energy storage device electrodes according to the present invention (hereinafter, simply referred to as composition) is characterized by including a conductive carbon material, a dispersant, a solvent, and a polymer having a pendant chain having a partial structure of formula (P1) described below (hereinafter, sometimes referred to as P1 polymer).

[Chem. 5]

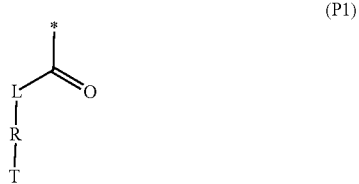

(P1)

In the formula, L represents —O— or —NH—, R represents an alkylene group having 1 to 20 carbon atoms, and T represents a substituted or unsubstituted amino group, a nitrogen-containing heteroaryl group having 2 to 20 carbon atoms, or a nitrogen-containing aliphatic heterocyclic group having 2 to 20 carbon atoms. * represents a bonding site.

The alkylene group having 1 to 20 carbon atoms may be linear, branched, or cyclic, and examples of the alkylene group include a methylene group, an ethylene group, a propylene group, a trimethylene group, a tetramethylene group, a pentylene group, a hexylene group, a heptylene group, an octylene group, a nonylene group, a decylene group, an undecylene group, a dodecylene group, a tridecylene group, a tetradecylene group, a pentadecylene group, a hexadecylene group, a heptadecylene group, an octadecylene group, a nonadecylene group, and an eicosanylene group. In the present invention, an alkylene group having 1 to 10 carbon atoms is preferable, an alkylene group having 1 to 8 carbon atoms is more preferable, and an alkylene group having 1 to 3 carbon atoms is still more preferable.

The substituted or unsubstituted amino group is preferably a group represented by the following (A1).

[Chem. 6]

(A1)

(In the formula, $R^{a1}$ and $R^{a2}$ each independently represent a hydrogen atom, an alkyl group having 1 to 20 carbon atoms, or a phenyl group. * is as described above.)

The alkyl group having 1 to 20 carbon atoms may be linear, branched, or cyclic, and examples of the alkyl group include linear or branched alkyl groups having 1 to 20 carbon atoms such as a methyl group, an ethyl group, an n-propyl group, an isopropyl group, an n-butyl group, an isobutyl group, an s-butyl group, a t-butyl group, an n-pentyl group, an n-hexyl group, an n-heptyl group, an n-octyl group, an n-nonyl group, and an n-decyl group and cyclic alkyl groups having 3 to 20 carbon atoms such as a cyclopropyl group, a cyclobutyl group, a cyclopentyl group, a cyclohexyl group, a cycloheptyl group, a cyclooctyl group, a cyclononyl group, a cyclodecyl group, a bicyclobutyl group, a bicyclopentyl group, a bicyclohexyl group, a bicycloheptyl group, a bicyclooctyl group, a bicyclononyl group, and a bicyclodecyl group.

$R^{a1}$ and $R^{a2}$ are preferably a hydrogen atom, an alkyl group having 1 to 10 carbon atoms, or a phenyl group, more preferably a hydrogen atom, an alkyl group having 1 to 5 carbon atoms, or a phenyl group, and still more preferably a methyl group. $R^{a1}$ and $R^{a2}$ may be the same as or different from each other, but are more preferably the same group.

Examples of the nitrogen-containing heteroaryl group having 2 to 20 carbon atoms include a 1-imidazolyl group, a 2-imidazolyl group, a 4-imidazolyl group, a 1-pyridyl group, a 2-pyridyl group, a 3-pyridyl group, a 4-pyridyl group, a pyrazine-1-yl group, a pyrazine-2-yl group, a pyrimidine-1-yl group, a pyrimidine-2-yl group, a pyrimidine-4-yl group, a pyrimidine-5-yl group, a pyridazine-1-yl group, a pyridazine-3-yl group, a pyridazine-4-yl group, a pyridazine-5-yl group, a 1,2,3-triazine-4-yl group, a 1,2,3-triazine-5-yl group, a 1,2,4-triazine-3-yl group, a 1,2,4-triazine-5-yl group, a 1,2,4-triazine-6-yl group, a 1,3,5-triazine-2-yl group, a 1,2,4,5-tetrazine-3-yl group, a 1,2,3,4-tetrazine-5-yl group, a quinoline-1-yl group, a quinoline-2-yl group, a quinoline-3-yl group, a quinoline-4-yl group, a quinoline-5-yl group, a quinoline-6-yl group, a quinoline-7-yl group, a quinoline-8-yl group, an isoquinoline-1-yl group, an isoquinoline-2-yl group, an isoquinoline-3-yl group, an isoquinoline-4-yl group, an isoquinoline-5-yl group, an isoquinoline-6-yl group, an isoquinoline-7-yl group, an isoquinoline-8-yl group, a quinoxaline-1-yl group, a quinoxaline-2-yl group, a quinoxaline-5-yl group, a quinoxaline-6-yl group, a quinazoline-1-yl group, a quinazoline-2-yl group, a quinazoline-3-yl group, a quinazoline-4-yl group, a quinazoline-5-yl group, a quinazoline-6-yl group, a quinazoline-7-yl group, a quinazoline-8-yl group, a cinnoline-1-yl group, a cinnoline-2-yl group, a cinnoline-3-yl group, a cinnoline-4-yl group, a cinnoline-5-yl group, a cinnoline-6-yl group, a cinnoline-7-yl group, and a cinnoline-8-yl group.

Examples of the nitrogen-containing aliphatic heterocyclic group having 2 to 20 carbon atoms include groups having an aziridine ring, groups having an azetidine ring, groups having a pyrrolidine ring, groups having a piperidine ring, groups having a hexamethyleneimine ring, groups having an imidazolidine ring, groups having a piperazine ring, and groups having a pyrazolidine ring. Specific examples of the nitrogen-containing aliphatic heterocyclic group include an aziridine-1-yl group, an aziridine-2-yl group, an azetidine-1-yl group, an azetidine-2-yl group, an azetidine-3-yl group, a pyrrolidine-1-yl group, a pyrrolidine-2-yl group, a pyrrolidine-3-yl group, a piperidine-1-yl group, a piperidine-2-yl group, a piperidine-3-yl group, a piperidine-4-yl group, an azepane-1-yl group, an azepane-2-yl group, an azepane-3-yl group, an azepane-4-yl group, an imidazolidine-1-yl group, an imidazolidine-2-yl group, an imidazolidine-4-yl group, a piperazine-1-yl group, a piperazine-2-yl group, a pyrazolidine-1-yl group, a pyrazolidine-3-yl group, a pyrazolidine-4-yl group, and a pyrazolidine-5-yl group.

Preferred aspects of the partial structure of formula (P1) include, but are not limited to, partial structures having formulas (P1-1) to (P1-3) described below.

[Chem. 7]

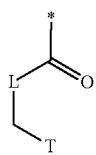

(P1-1)

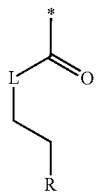

(P1-2)

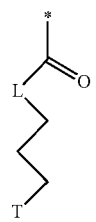

(P1-3)

(In the formulas, L, T, and * are as described above.)

Specific examples of the partial structure of formula (P1) include, but are not limited to, partial structures having formulas (P2-1) to (P2-3) described below.

[Chem. 8]

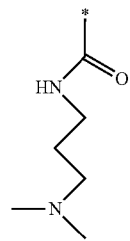

(P2-1)

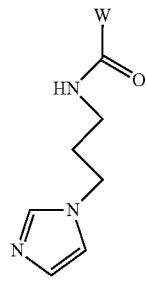

(P2-2)

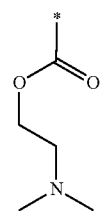

(P2-3)

(In the formulas, * is as described above.)

The partial structure of (P1) may be directly bonded to the main chain of the polymer or bonded via a spacer group such as an alkylene group, but is preferably directly bonded to the main chain of the polymer.

Examples of the aspect of the P1 polymer include, but are not limited to, polymers including repeating units of formula (C1-1) or (C1-2) described below.

[Chem. 9]

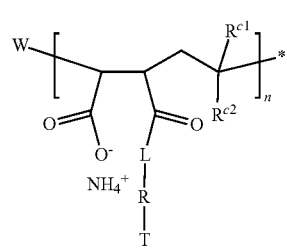

(C1-1)

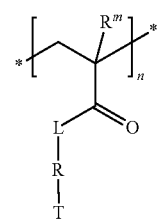

(C1-2)

(In the formulas, $R^{c1}$ and $R^{c2}$ each independently represent a hydrogen atom or an alkyl group having 1 to 20 carbon atoms, $R^m$ represents a hydrogen atom or a methyl group, and n represents a natural number. L, R, T, and * are as described above.)

Examples of the alkyl group having 1 to 20 carbon atoms include the alkyl groups described above as examples of $R^{c1}$ and $R^{c2}$. Among these alkyl groups, $R^{c1}$ and $R^{c2}$ are preferably a hydrogen atom or an alkyl group having 1 to 10 carbon atoms, more preferably a hydrogen atom or an alkyl group having 1 to 5 carbon atoms, and still more preferably a methyl group. $R^{c1}$ and $R^{c2}$ may be the same as or different from each other, but are more preferably the same group.

Examples of the preferred aspect of the P1 polymer include, but are not limited to, polymers including repeating units of any of formulas (C2-1) to (C2-6) described below.

[Chem. 10]

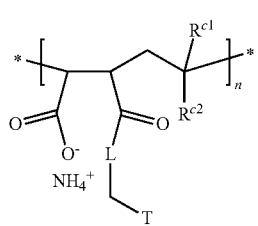
(C2-1)

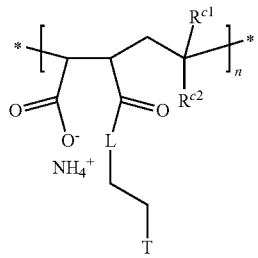
(C2-2)

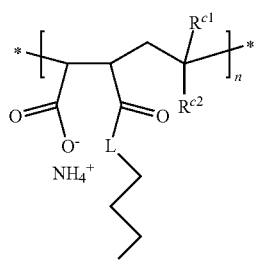
(C2-3)

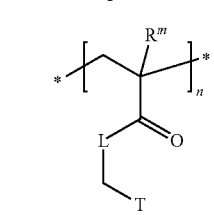
(C2-4)

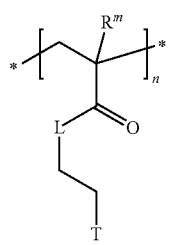
(C2-5)

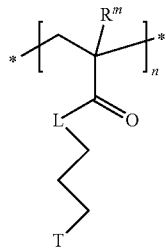
(C2-6)

(In the formulas, L, T, $R^m$, n, and * are as described above.)

Specific examples of the P1 polymer include, but are not limited to, polymers including repeating units of any of formulas (C3-1) to (C3-3) described below.

[Chem. 11]

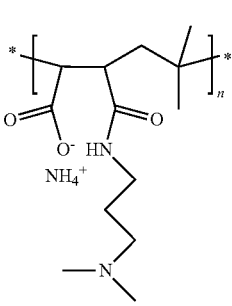
(C3-1)

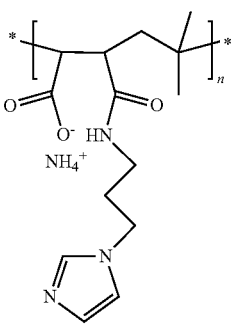
(C3-2)

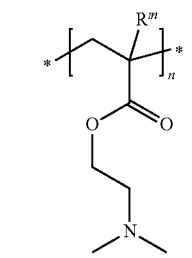
(C3-3)

(In the formulas, $R^m$, n, and * are as described above.)

The average molecular weight of the P1 polymer is not particularly limited, but the weight average molecular weight (Mw) is preferably 1,000 to 2,000,000, and more preferably 2,000 to 1,000,000. The weight average molecular weight is a sodium polystyrene sulfonate-equivalent value obtained by gel permeation chromatography.

In the present invention, the P1 polymer preferably includes 10 to 100 mol %, more preferably 30 to 100 mol %, and still more preferably 50 to 100 mol % of the pendant chain of formula (P1) per all the repeating units from the viewpoint of reproducibly obtaining a thin film having high adhesion.

In the present invention, the P1 polymer may include, as repeating units other than the repeating units of formula (P1), repeating units to impart another function as long as an effect of the present invention is not impaired. Examples of such repeating units include repeating units having a crosslinking reactive group that causes a crosslinking reaction with a dispersant, and preferably include repeating units of the following formula (P3).

[Chem. 12]

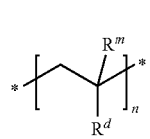

(P3)

(In the formula, $R^d$ represents a crosslinking reactive group. $R^m$, n, and * are as described above.)

Examples of $R^d$ include a carboxy group, an aromatic thiol group, and a phenol group, and a carboxy group is preferable.

In the case of the P1 polymer including the repeating units of formula (P3), the content of the repeating units is preferably 10 to 70 mol %, more preferably 20 to 70 mol %, and still more preferably 30 to 70 mol % per all the repeating units.

In the polymer including the repeating units of formula (C1-1), examples of the repeating units other than the repeating units of formula (P1) include repeating units of the following formula (D1). The polymer may partially include repeating units of formula (C1-1') described below as an unreacted site of a copolymer of isobutylene and maleic anhydride as raw materials of the polymer. In the polymer including the repeating units of formula (C1-2), examples of other repeating units include repeating units of the following formula (D2).

[Chem. 13]

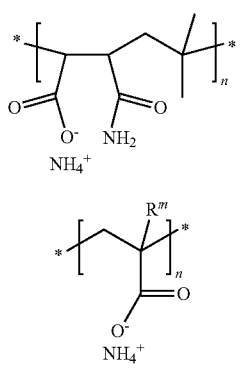

(D1)

(D2)

(In the formulas, n and * are as described above.)

The amount of the P1 polymer to be added depends on the solvent to be used, the substrate to be used, the required viscosity, the required film shape, and the like, and is preferably 10 to 1,000 parts by weight, more preferably 30 to 800 parts by weight, and still more preferably 40 to 500 parts by weight per 100 parts by weight of the conductive carbon material described below. By setting the amount of the P1 polymer to be added within the above range, the adhesion between the current collector and the electrode mixture layer can be further improved, and the characteristics of the obtained battery can be improved.

The P1 polymer can be obtained by a method of polymerizing a monomer obtained by reacting a compound of the following formula (Q1) with a compound having a carboxy group or an acid anhydride group (monomer raw material), or can be obtained by reacting a compound of the following formula (Q1) with a polymer having a pendant chain having a carboxy group or an acid anhydride group.

[Chem. 14]

(Q1)

(In the formula, L' represents an amino group or a hydroxy group. R and T are as described above.)

Preferred aspects of the compound of formula (Q1) include, but are not limited to, compounds having formulas (Q1-1) to (Q1-3) described below.

[Chem. 15]

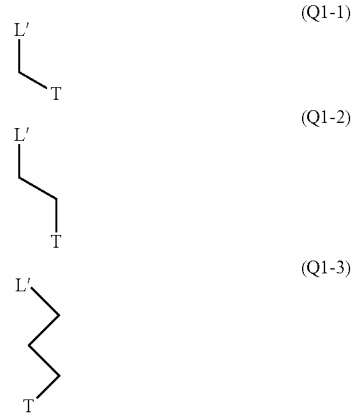

(Q1-1)

(Q1-2)

(Q1-3)

(In the formulas, L' and T are as described above.)

Specific examples of the compound of formula (Q1) include 1-(3-aminopropyl)imidazole, 1-(3-hydroxypropyl)imidazole, N,N-dimethyl-1,3-propanediamine, and N,N-dimethylethanolamine.

Examples of the monomer raw material include maleic anhydride and (meth)acrylic acid.

Examples of the polymer having a pendant chain having a carboxy group or an acid anhydride group include a polymer of maleic anhydride, copolymers of an alkene having 2 to 10 carbon atoms such as isobutylene and maleic anhydride, and polymers of (meth)acrylic acid. In the present invention, a copolymer of isobutylene and maleic anhydride of the following formula (C1-1') and a polymer of (meth)acrylic acid of the following formula (C1-2') are preferable.

[Chem. 16]

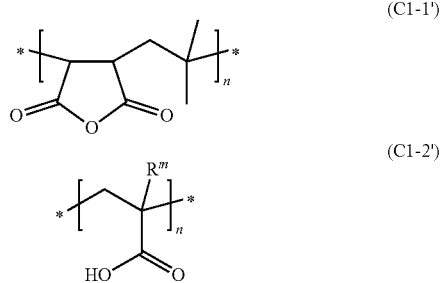

(C1-1')

(C1-2')

(In the formulas, $R^{c1}$, $R^{c2}$, $R^m$, n, and * are as described above.)

In the case of synthesizing a polymer including repeating units of formula (C3-1) as the P1 polymer, a method shown in the following scheme 1 can be used.

scheme 1

[Chem. 17]

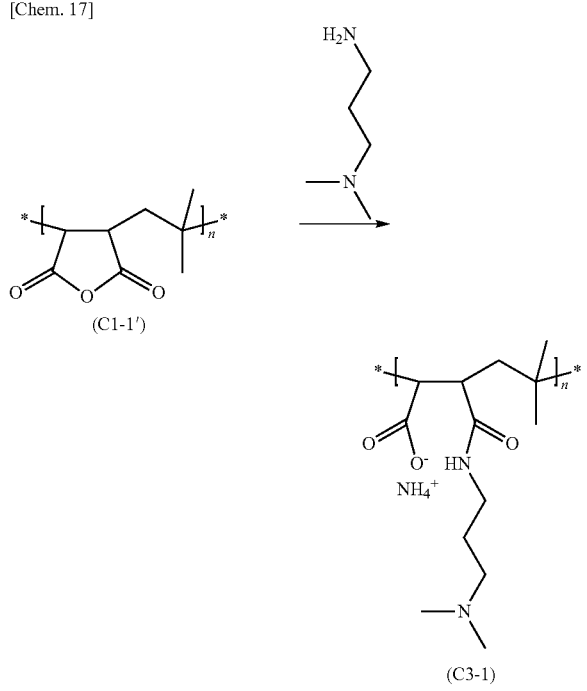

(C1-1')

(C3-1)

(In the formulas, n and * are as described above.)

In the scheme 1, a copolymer of isobutylene and maleic anhydride (C1-1') is reacted with N,N-dimethyl-1,3-propanediamine, then the resulting reaction solution is stirred in the presence of ammonia for a predetermined time, and thus a polymer including repeating units of formula (C3-1) can be synthesized. As the copolymer of isobutylene and maleic anhydride (C1-1'), a commercially available product can be used, and examples of the product include the ISOBAM series (manufactured by Kuraray Co., Ltd.: trade name).

The solvent used in the above reaction is not particularly limited as long as it can disperse or dissolve a raw material to be used. Examples of such a solvent include dimethyl sulfoxide, N,N-dimethylformamide, N,N-dimethylacetamide, N-methyl-2-pyrrolidone (NMP), hexamethylphosphoric triamide, acetonitrile, acetone, alcohols (such as methanol, ethanol, 1-propanol, and 2-propanol), glycols (such as ethylene glycol and triethylene glycol), cellosolves (such as ethyl cellosolve and methyl cellosolve), polyhydric alcohols (such as glycerin and pentaerythritol), tetrahydrofuran, toluene, ethyl acetate, butyl acetate, benzene, toluene, xylene, pentane, hexane, heptane, chlorobenzene, dichlorobenzene, trichlorobenzene, hexadecane, benzyl alcohol, and oleylamine. Among them, N,N-dimethylformamide, N,N-dimethylacetamide, and N-methyl-2-pyrrolidone are preferable from the viewpoints of reaction temperature and reaction concentration. These solvents are to be appropriately selected according to the raw material to be used. The solvents may be used singly or in combination of two or more kinds thereof.

In the above reaction, the polymer (C1-1') and N,N-dimethyl-1,3-propanediamine are preferably compounded in an amount to give a compounding ratio such that all of the acid anhydride groups in the polymer (C1-1') can react with N,N-dimethyl-1,3-propanediamine, and the amount of N,N-dimethyl-1,3-propanediamine is preferably 1 to 3 mol, and more preferably 1 to 2 mol per 1 mol of the repeating units of the polymer (C1-1').

The reaction temperature of the above reaction is usually 40 to 200° C. The reaction time is variously selected according to the reaction temperature, and is usually about 30 minutes to 50 hours.

The reaction solution of the obtained polymer may be used as it is, or may be diluted or concentrated for use, or the polymer may be isolated with an appropriate means and then dissolved in an appropriate solvent for use. Examples of the solvent include the solvents described above.

In the case of synthesizing a polymer including repeating units of formula (C3-3) as the above-described polymer, a method shown in the following scheme 2 can be used.

scheme 2

[Chem. 18]

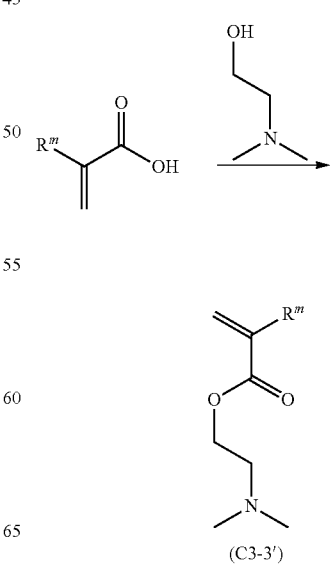

(C3-3')

-continued

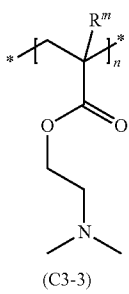

(C3-3)

(In the formulas, $R^m$, n, and * are as described above.)

In the scheme 2, first, (meth)acrylic acid and N,N-dimethylethanolamine are esterified to synthesize a monomer (C3-3') (first stage). Next, the obtained monomer (C3-3') is polymerized in a solution (second stage), and thus a polymer including repeating units of formula (C3-3) can be synthesized. In a case where a commercially available product can be used as the monomer (C3-3'), the process may be performed from the second stage using the commercially available product as it is.

The solvent used in the reaction in the first stage is not particularly limited as long as it can disperse or dissolve a raw material to be used. Examples of such a solvent include the same solvents as those listed in the scheme 1, and the solvents are to be appropriately selected according to the raw material to be used. The solvents may be used singly or in combination of two or more kinds thereof.

In the above reaction, an acid or a base can be used as a catalyst. Specific examples thereof include inorganic acids such as hydrochloric acid, sulfuric acid, nitric acid, and phosphoric acid, organic carboxylic acids such as acetic acid, propionic acid, phthalic acid, and benzoic acid, organic sulfonic acids such as methylsulfonic acid, benzenesulfonic acid, p-toluenesulfonic acid, and trifluoromethanesulfonic acid, hydroxides of an alkali metal or alkaline earth metal such as sodium hydroxide, potassium hydroxide, and magnesium hydroxide, carbonates and hydrogen carbonates of an alkali metal or alkaline earth metal such as sodium hydrogen carbonate, potassium carbonate, and calcium hydrogen carbonate.

In the second stage, the monomer (C3-3') obtained in the first stage is polymerized in a solvent. The polymerization method is not particularly limited, and can be appropriately selected from polymerization methods usually used in polymerization of an acrylic polymer. Examples of the polymerization method include a solution polymerization method, an emulsion polymerization method, and a suspension polymerization method. In the polymerization, an initiator may be used. As the initiator, a commercially available product can be used, and examples of the product include AIBN, VE-073, V-70, V-65, V-601, V-59, V-40, Vm-110, VA-044, V-046B, V-50, VA-057, VA-061, VA-086, and V-501 (all manufactured by FUJIFILM Wako Pure Chemical Corporation).

The reaction solution of the obtained polymer may be used as it is, or may be diluted or concentrated for use, or the polymer may be isolated with an appropriate means and then dissolved in an appropriate solvent for use. Examples of the solvent include the solvents described above.

The conductive carbon material is not particularly limited, and can be appropriately selected for use from known conductive carbon materials such as carbon black, Ketjen black, acetylene black, carbon whiskers, carbon nanotubes (CNTs), carbon fibers, natural graphite, and synthetic graphite, and CNTs are particularly preferable from the viewpoints of conductivity, dispersibility, availability, and the like.

CNTs are generally produced with an arc discharge method, a chemical vapor deposition method (CVD method), a laser ablation method, or the like, and the CNT used in the present invention may be obtained by any of these methods. CNTs are categorized as single-walled CNTs consisting of a single cylindrically rolled carbon film (graphene sheet) (abbreviated below as SWCNTs), double-walled CNTs consisting of two concentrically rolled graphene sheets (abbreviated below as DWCNTs), and multi-walled CNTs consisting of a plurality of concentrically rolled graphene sheets (MWCNTs). In the present invention, SWCNTs, DWCNTs, or MWCNTs may be used alone, or a plurality of these types of CNTs may be used in combination.

When the above methods are used to produce SWCNTs, DWCNTs, or MWCNTs, a catalyst metal such as nickel, iron, cobalt, or yttrium may remain in the product, and therefore purification to remove the impurity is sometimes necessary. For the removal of the impurity, acid treatment with nitric acid, sulfuric acid, or the like and ultrasonic treatment are effective. However, in the acid treatment with nitric acid, sulfuric acid, or the like, the π-conjugated system making up the CNTs may be destroyed to impair the properties inherent to the CNTs, so that it is desirable to purify and use the CNTs under suitable conditions.

Specific examples of the CNTs that may be used in the present invention include CNTs synthesized with the super growth method (manufactured by the New Energy and Industrial Technology Development Organization in the National Research and Development Agency), eDIPS-CNTs (manufactured by the New Energy and Industrial Technology Development Organization in the National Research and Development Agency), the SWNT series (manufactured by MEIJO NANO CARBON Co., Ltd.: trade name), the VGCF series (manufactured by Showa Denko K.K.: trade name), the FloTube series (manufactured by CNano Technology: trade name), AMC (manufactured by Ube Industries, Ltd.: trade name), the NANOCYL NC7000 series (manufactured by Nanocyl S.A.: trade name), Baytubes (manufactured by Bayer: trade name), GRAPHISTRENGTH (manufactured by Arkema S.A.: trade name), MWNT7 (manufactured by Hodogaya Chemical Co., Ltd.: trade name), Hyperion CNT (manufactured by Hyperion Catalysis International: trade name), the TC series (manufactured by TODA KOGYO CORP.: trade name), and the FloTube series (manufactured by Jiangsu Cnano Technology Ltd.: trade name).

The dispersant can be appropriately selected from those conventionally used as dispersants for conductive carbon materials such as CNTs, and examples thereof include carboxymethyl cellulose (CMC), polyvinyl pyrrolidone (PVP), acrylic resin emulsions, water-soluble acrylic polymers, styrene emulsions, silicon emulsions, acrylic silicon emulsions, fluororesin emulsions, EVA emulsions, vinyl acetate emulsions, vinyl chloride emulsions, urethane resin emulsions, a triarylamine-based highly branched polymer described in WO 2014/042080, and a pendant oxazoline group-containing polymer described in WO 2015/029949. In the present invention, it is preferable to use a dispersant including a pendant oxazoline group-containing polymer described in WO 2015/029949 or a dispersant including a triarylamine-based highly branched polymer described in WO 2014/042080.

The pendant oxazoline group-containing polymer (hereinafter, referred to as oxazoline polymer) is preferably a pendant oxazoline group-containing vinyl-based polymer that is obtained by radical polymerization of an oxazoline monomer of formula (1) having a polymerizable carbon-carbon double bond-containing group at the second position and has repeating units that are bonded at the second position of the oxazoline ring to the polymer main chain or to spacer groups.

[Chem. 19]

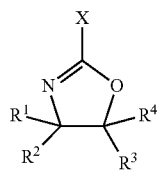

(1)

X represents a polymerizable carbon-carbon double bond-containing group, and $R^1$ to $R^4$ each independently represent a hydrogen atom, a halogen atom, an alkyl group having 1 to 5 carbon atoms, an aryl group having 6 to 20 carbon atoms, or an aralkyl group having 7 to 20 carbon atoms.

The polymerizable carbon-carbon double bond-containing group of the oxazoline monomer is not particularly limited as long as the group contains a polymerizable carbon-carbon double bond, but a chain hydrocarbon group containing a polymerizable carbon-carbon double bond is preferable. For example, alkenyl groups having 2 to 8 carbon atoms such as a vinyl group, an allyl group, and an isopropenyl group are preferable. Examples of the halogen atom include a fluorine atom, a chlorine atom, a bromine atom, and an iodine atom. The alkyl group having 1 to 5 carbon atoms may be linear, branched, or cyclic, and examples of the alkyl group include a methyl group, an ethyl group, an n-propyl group, an isopropyl group, an n-butyl group, a sec-butyl group, a tert-butyl group, an n-pentyl group, and a cyclohexyl group. Examples of the aryl group having 6 to 20 carbon atoms include a phenyl group, a xylyl group, a tolyl group, a biphenyl group, and a naphthyl group. Examples of the aralkyl group having 7 to 20 carbon atoms include a benzyl group, a phenylethyl group, and a phenylcyclohexyl group.

Examples of the oxazoline monomer of formula (1) having a polymerizable carbon-carbon double bond-containing group at the second position include 2-vinyl-2-oxazoline, 2-vinyl-4-methyl-2-oxazoline, 2-vinyl-4-ethyl-2-oxazoline, 2-vinyl-4-propyl-2-oxazoline, 2-vinyl-4-butyl-2-oxazoline, 2-vinyl-5-methyl-2-oxazoline, 2-vinyl-5-ethyl-2-oxazoline, 2-vinyl-5-propyl-2-oxazoline, 2-vinyl-5-butyl-2-oxazoline, 2-isopropenyl-2-oxazoline, 2-isopropenyl-4-methyl-2-oxazoline, 2-isopropenyl-4-ethyl-2-oxazoline, 2-isopropenyl-4-propyl-2-oxazoline, 2-isopropenyl-4-butyl-2-oxazoline, 2-isopropenyl-5-methyl-2-oxazoline, 2-isopropenyl-5-ethyl-2-oxazoline, 2-isopropenyl-5-propyl-2-oxazoline, and 2-isopropenyl-5-butyl-2-oxazoline, and 2-isopropenyl-2-oxazoline is preferable from the viewpoint of availability and the like.

In consideration that an aqueous solvent is used for preparing a composition, the oxazoline polymer is also preferably water-soluble. Such a water-soluble oxazoline polymer may be a homopolymer of the oxazoline monomer of formula (1), but in order to further enhance the solubility in water, the water-soluble oxazoline polymer is preferably obtained by radical polymerization of at least two monomers including the oxazoline monomer and a (meth)acrylic acid ester-based monomer having a hydrophilic functional group.

Examples of the (meth)acrylic monomer having a hydrophilic functional group include (meth)acrylic acid, 2-hydroxyethyl acrylate, methoxy polyethylene glycol acrylate, monoesters of acrylic acid with polyethylene glycol, 2-aminoethyl acrylate and its salts, 2-hydroxyethyl methacrylate, methoxy polyethylene glycol methacrylate, monoesters of methacrylic acid with polyethylene glycol, 2-aminoethyl methacrylate and its salts, sodium (meth)acrylate, ammonium (meth)acrylate, (meth)acrylonitrile, (meth)acrylamide, N-methylol (meth)acrylamide, N-(2-hydroxyethyl) (meth)acrylamide, and sodium styrenesulfonate. They may be used singly or in combination of two or more kinds thereof. Among them, methoxy polyethylene glycol (meth)acrylate and monoesters of (meth)acrylic acid with polyethylene glycol are suitable.

In addition to the oxazoline monomer and the (meth)acrylic monomer having a hydrophilic functional group, other monomers can be used in combination as long as the CNT-dispersing ability of the oxazoline polymer is not adversely affected. Examples of such other monomers include (meth)acrylic acid ester monomers such as methyl (meth)acrylate, ethyl (meth)acrylate, butyl (meth)acrylate, 2-ethylhexyl (meth)acrylate, stearyl (meth)acrylate, perfluoroethyl (meth)acrylate, and phenyl (meth)acrylate, olefin-based monomers such as ethylene, propylene, butene, and pentene, haloolefin-based monomers such as vinyl chloride, vinylidene chloride, and vinyl fluoride, styrene-based monomers such as styrene and α-methylstyrene, vinyl carboxylate-based monomers such as vinyl acetate and vinyl propionate, and vinyl ether-based monomers such as methyl vinyl ether and ethyl vinyl ether. They may each be used singly or may be used in combination of two or more kinds thereof.

In the monomer components used for manufacturing the oxazoline polymer used in the present invention, the content of the oxazoline monomer is preferably 10 wt % or more, more preferably 20 wt % or more, and still more preferably 30 wt % or more from the viewpoint of further enhancing the CNT-dispersing ability of the resulting oxazoline polymer. The upper limit of the content of the oxazoline monomer in the monomer components is 100 wt %, and if the content is 100 wt %, a homopolymer of the oxazoline monomer is obtained.

Meanwhile, from the viewpoint of further enhancing the water solubility of the resulting oxazoline polymer, the content of the (meth)acrylic monomer having a hydrophilic functional group in the monomer components is preferably 10 wt % or more, more preferably 20 wt % or more, and still more preferably 30 wt % or more.

As described above, the content of other monomers in the monomer components is in a range in which the CNT-dispersing ability of the resulting oxazoline polymer is not affected, and the content depends on the kinds of monomers. Therefore, the content cannot be strictly specified, but is to be suitably set preferably in the range of 5 to 95 wt %, and more preferably 10 to 90 wt %.

The average molecular weight of the oxazoline polymer is not particularly limited, but the weight average molecular weight is preferably 1,000 to 2,000,000, and more preferably 2,000 to 1,000,000. The weight average molecular weight is a polystyrene-equivalent value obtained by gel permeation chromatography.

The oxazoline polymer that may be used in the present invention can be synthesized by a known radical polymerization of the above monomers, or can be acquired as a commercially available product. Examples of such a commercially available product include EPOCROS WS-300 (manufactured by NIPPON SHOKUBAI CO., LTD., solid content concentration: 10 wt %, aqueous solution), EPOCROS WS-700 (manufactured by NIPPON SHOKUBAI CO., LTD., solid content concentration: 25 wt %, aqueous solution), EPOCROS WS-500 (manufactured by NIPPON SHOKUBAI CO., LTD., solid content concentration: 39 wt %, water/1-methoxy-2-propanol solution), Poly(2-ethyl-2-oxazoline) (Aldrich), Poly(2-ethyl-2-oxazoline) (Alfa Aesar), and Poly(2-ethyl-2-oxazoline) (VWR International, LLC).

An oxazoline polymer that is commercially available in the form of a solution may be used as it is, or may be used after replacing the solvent with a target solvent.

Suitable use can be made of triarylamine-based highly branched polymers of formulas (2) and (3) described below obtained by condensation polymerization of a triarylamine with an aldehyde and/or a ketone under acidic conditions.

[Chem. 20]

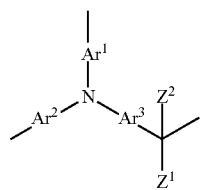

(2)

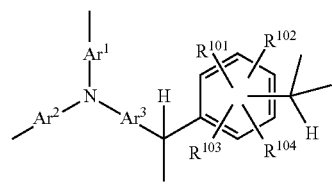

(3)

In the above-described formulas (2) and (3), $Ar^1$ to $Ar^3$ each independently represent any of divalent organic groups of formulas (4) to (8), and a substituted or unsubstituted phenylene group of formula (4) is particularly preferable.

[Chem. 21]

(4)

(5)

(6)

(7)

(8)

In formulas (2) and (3), $Z^1$ and $Z^2$ each independently represent a hydrogen atom, a linear or branched alkyl group having 1 to 5 carbon atoms, or any of monovalent organic groups of formulas (9) to (12) (provided that $Z^1$ and $Z^2$ do not represent the alkyl group at the same time).

[Chem. 22]

(9)

(10)

(11)

(12)

In the above-described formulas (3) to (8), $R^{101}$ to $R^{138}$ each independently represent a hydrogen atom, a halogen atom, a linear or branched alkyl group having 1 to 5 carbon atoms, a linear or branched alkoxy group having 1 to 5 carbon atoms, a carboxyl group, a sulfo group, a phosphate group, a phosphonic acid group, or a salt thereof.

Examples of the halogen atom include a fluorine atom, a chlorine atom, a bromine atom, and an iodine atom.

Examples of the linear or branched alkyl group having 1 to 5 carbon atoms include a methyl group, an ethyl group, an n-propyl group, an isopropyl group, an n-butyl group, a sec-butyl group, a tert-butyl group, and an n-pentyl group.

Examples of the linear or branched alkoxy group having 1 to 5 carbon atoms include a methoxy group, an ethoxy group, an n-propoxy group, an isopropoxy group, an n-butoxy group, a sec-butoxy group, a tert-butoxy group, and an n-pentoxy group.

Examples of the salts of a carboxyl group, a sulfo group, a phosphate group, and a phosphonic acid group include salts of alkali metals such as sodium and potassium, salts of Group 2 metals such as magnesium and calcium, ammonium salts, salts of aliphatic amines such as propylamine, dimethylamine, triethylamine, and ethylenediamine, salts of alicyclic amines such as imidazoline, piperazine, and morpholine, salts of aromatic amines such as aniline and diphenylamine, and pyridinium salts.

In the above-described formulas (9) to (12), $R^{139}$ to $R^{162}$ each independently represent a hydrogen atom, a halogen atom, a linear or branched alkyl group having 1 to 5 carbon atoms, a linear or branched haloalkyl group having 1 to 5 carbon atoms, a phenyl group, $OR^{163}$, $COR^{163}$, $NR^{163}R^{164}$, $COOR^{165}$ (wherein $R^{163}$ and $R^{164}$ each independently represent a hydrogen atom, a linear or branched alkyl group having 1 to 5 carbon atoms, a linear or branched haloalkyl group having 1 to 5 carbon atoms, or a phenyl group, and $R^{165}$ represents a linear or branched alkyl group having 1 to 5 carbon atoms, a linear or branched haloalkyl group having 1 to 5 carbon atoms, or a phenyl group), a carboxyl group, a sulfo group, a phosphate group, a phosphonic acid group, or a salt thereof.

Here, examples of the linear or branched haloalkyl group having 1 to 5 carbon atoms include a difluoromethyl group, a trifluoromethyl group, a bromodifluoromethyl group, a 2-chloroethyl group, a 2-bromoethyl group, a 1,1-difluoroethyl group, a 2,2,2-trifluoroethyl group, a 1,1,2,2-tetrafluoroethyl group, a 2-chloro-1,1,2-trifluoroethyl group, a pentafluoroethyl group, a 3-bromopropyl group, a 2,2,3,3-tetrafluoropropyl group, a 1,1,2,3,3,3-hexafluoropropyl group, a 1,1,1,3,3,3-hexafluoropropane-2-yl group, a 3-bromo-2-methylpropyl group, a 4-bromobutyl group, and a perfluoropentyl group.

Examples of the halogen atom and the linear or branched alkyl group having 1 to 5 carbon atoms include the same groups as those described above as examples in formulas (3) to (8).

$Z^1$ and $Z^2$ are each independently preferably a hydrogen atom, a 2- or 3-thienyl group, or a group of formula (9), and it is particularly preferable that one of $Z^1$ and $Z^2$ be a hydrogen atom and the other be a hydrogen atom, a 2- or 3-thienyl group, or a group of formula (9), and in particular, it is more preferable that $R^{141}$ be a phenyl group or $R^{141}$ be a methoxy group.

In a case where $R^{141}$ is a phenyl group and the acidic group insertion method described below is used in which an acidic group is inserted after manufacturing a polymer, an acidic group may be inserted onto this phenyl group.

In particular in consideration of further improving the adhesion to the current collector, the highly branched polymer preferably has at least one acidic group selected from a carboxyl group, a sulfo group, a phosphate group, a phosphonic acid group, and salts thereof in at least one aromatic ring in the repeating units of formula (2) or (3), and more preferably has a sulfo group or its salt.

Examples of the aldehyde compound used for manufacturing the highly branched polymer include saturated aliphatic aldehydes such as formaldehyde, paraformaldehyde, acetaldehyde, propylaldehyde, butyraldehyde, isobutyraldehyde, valeraldehyde, capronaldehyde, 2-methylbutyraldehyde, hexylaldehyde, undecylaldehyde, 7-methoxy-3,7-dimethyloctylaldehyde, cyclohexanecarboxyaldehyde, 3-methyl-2-butyraldehyde, glyoxal, malonaldehyde, succinaldehyde, glutaraldehyde, and adipinaldehyde, unsaturated aliphatic aldehydes such as acrolein and methacrolein, heterocyclic aldehydes such as furfural, pyridinealdehyde, and thiophenealdehyde, aromatic aldehydes such as benzaldehyde, tolylaldehyde, trifluoromethylbenzaldehyde, phenylbenzaldehyde, salicylaldehyde, anisaldehyde, acetoxybenzaldehyde, terephthalaldehyde, acetylbenzaldehyde, formylbenzoic acid, methyl formylbenzoate, aminobenzaldehyde, N,N-dimethylaminobenzaldehyde, N,N-diphenylaminobenzaldehyde, naphthylaldehyde, anthrylaldehyde, and phenanthrylaldehyde, and aralkyl aldehydes such as phenylacetaldehyde and 3-phenylpropionaldehyde. Among them, aromatic aldehydes are preferably used.

The ketone compound used for manufacturing the highly branched polymer is an alkyl aryl ketone or a diaryl ketone, and examples of the ketone include acetophenone, propiophenone, diphenyl ketone, phenyl naphthyl ketone, dinaphthyl ketone, phenyl tolyl ketone, and ditolyl ketone.

The highly branched polymer used in the present invention can be manufactured, for example, according to the method described in WO 2014/042080.

The average molecular weight of the highly branched polymer is not particularly limited, but the weight average molecular weight is preferably 1,000 to 2,000,000, and more preferably 2,000 to 1,000,000.

Specific examples of the highly branched polymer include, but are not limited to, those represented by the following formula.

[Chem. 23]

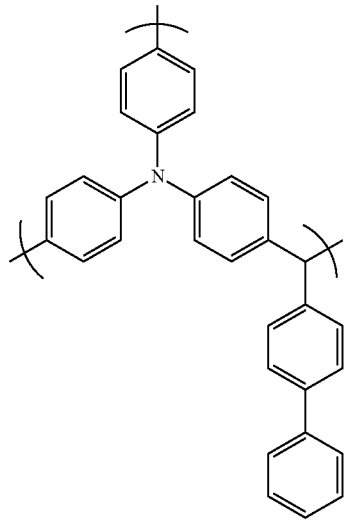

-continued

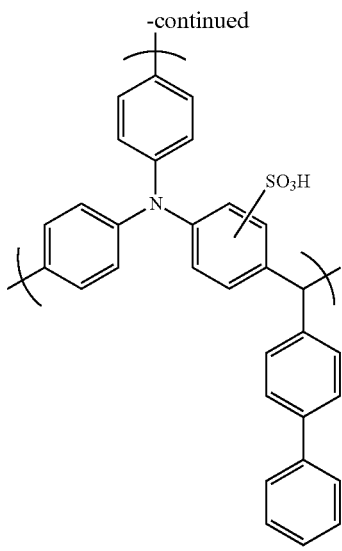

In the present invention, the CNT and the dispersant can be mixed at a ratio by weight of about 1,000:1 to 1:100.

The amount of the dispersant added is not particularly limited as long as the concentration of the dispersant is such that the CNT can be dispersed in the solvent, but is preferably 5 to 700 parts by weight, more preferably 10 to 500 parts by weight, and still more preferably 20 to 300 parts by weight per 100 parts by weight of the conductive carbon material.

As long as an effect of the present invention is not impaired, the composition of the present invention may include a crosslinking agent that causes a crosslinking reaction with the dispersant to be used, or may include a self-crosslinking agent. These crosslinking agents are preferably dissolved in a solvent to be used.

Examples of the crosslinking agent of the triarylamine-based highly branched polymer include melamine-based crosslinking agents, substituted urea-based crosslinking agents, and polymer-based crosslinking agents including a polymer of melamine or substituted urea. These crosslinking agents can be used singly, or in combination of two or more kinds thereof. A crosslinking agent having at least two crosslink-forming substituents is preferred, and examples of such a crosslinking agent include compounds such as CYMEL (registered trademark), methoxymethylated glycoluril, butoxymethylated glycoluril, methylolated glycoluril, methoxymethylated melamine, butoxymethylated melamine, methylolated melamine, methoxymethylated benzoguanamine, butoxymethylated benzoguanamine, methylolated benzoguanamine, methoxymethylated urea, butoxymethylated urea, methylolated urea, methoxymethylated thiourea, butoxymethylated thiourea, and methylolated thiourea, and condensates of these compounds.

The crosslinking agent of the oxazoline polymer is not particularly limited as long as the crosslinking agent is a compound having two or more functional groups that react with oxazoline groups, such as carboxyl, hydroxyl, thiol, amino, sulfinic acid, and epoxy groups, but a compound having two or more carboxyl groups is preferable. As the crosslinking agent, a compound can be used that has functional groups that generate, under heating during thin-film formation or in the presence of an acid catalyst, the functional groups described above to cause crosslinking reactions, and examples of such a compound include compounds having a sodium salt, a potassium salt, a lithium salt, an ammonium salt, or the like of carboxylic acid.

Specific examples of the compound that causes a crosslinking reaction with an oxazoline group include metal salts that exhibit crosslinking reactivity in the presence of an acid catalyst, including metal salts of synthetic polymers such as polyacrylic acid and copolymers thereof and metal salts of natural polymers such as carboxymethylcellulose and alginic acid, and include ammonium salts that exhibit crosslinking reactivity under heating, including ammonium salts of the above-described synthetic polymers and natural polymers. In particular, sodium polyacrylate, lithium polyacrylate, ammonium polyacrylate, carboxymethylcellulose sodium, carboxymethylcellulose lithium, carboxymethylcellulose ammonium, and the like, which exhibit crosslinking reactivity in the presence of an acid catalyst or under heating conditions, are preferable.

Such a compound that causes a crosslinking reaction with an oxazoline group can be acquired as a commercially available product. Examples of the commercially available product include sodium polyacrylate (manufactured by FUJIFILM Wako Pure Chemical Corporation, degree of polymerization: 2,700 to 7,500), carboxymethylcellulose sodium (manufactured by FUJIFILM Wako Pure Chemical Corporation), sodium alginate (manufactured by KANTO CHEMICAL CO., INC., Cica first grade), Aron A-30 (ammonium polyacrylate, manufactured by Toagosei Co., Ltd., solid content concentration: 32 wt %, aqueous solution), DN-800H (carboxymethylcellulose ammonium, manufactured by Daicel FineChem Ltd.) and ammonium alginate (manufactured by KIMICA Corporation).

Examples of the self-crosslinking agent include compounds having, on the same molecule, crosslinkable functional groups that react with one another, such as a hydroxyl group with an aldehyde group, epoxy group, vinyl group, isocyanate group, or alkoxy group, a carboxyl group with an aldehyde group, amino group, isocyanate group, or epoxy group, or an amino group with an isocyanate group or aldehyde group, and compounds having like crosslinkable functional groups that react with one another, such as hydroxyl groups (dehydration condensation), mercapto groups (disulfide bonding), ester groups (Claisen condensation), silanol groups (dehydration condensation), vinyl groups, or acrylic groups.

Specific examples of the self-crosslinking agent include self-crosslinking agents that exhibit crosslinking reactivity in the presence of an acid catalyst, such as polyfunctional acrylates, tetraalkoxysilanes, and block copolymers of a blocked isocyanate group-containing monomer and a monomer having at least one of a hydroxyl group, carboxylic acid, or an amino group.

Such a self-crosslinking agent can be acquired as a commercially available product. Examples of the commercially available product include polyfunctional acrylates such as A-9300 (ethoxylated isocyanuric acid triacrylate, manufactured by SHIN-NAKAMURA CHEMICAL Co., Ltd.), A-GLY-9E (Ethoxylated glycerine triacrylate (EO 9 mol), manufactured by SHIN-NAKAMURA CHEMICAL Co., Ltd.), and A-TMMT (pentaerythritol tetraacrylate, manufactured by SHIN-NAKAMURA CHEMICAL Co., Ltd.), tetraalkoxysilanes such as tetramethoxysilane (manufactured by Tokyo Chemical Industry Co., Ltd.) and tetraethoxysilane (manufactured by Toyoko Kagaku Co., Ltd.), and blocked isocyanate group-containing polymers such as the ELASTRON series E-37, H-3, H38, BAP, NEW BAP-15, C-52, F-29, W-11P, MF-9, and MF-25K (manufactured by DKS Co., Ltd.).

In the case of adding a crosslinking agent, the amount of the crosslinking agent depends on the solvent to be used, the substrate to be used, the required viscosity, the required film shape, and the like, and is preferably 5 to 1,000 parts by weight, more preferably 10 to 800 parts by weight, and still more preferably 20 to 500 parts by weight per 100 parts by weight of the conductive carbon material. Although these crosslinking agents may cause a crosslinking reaction by self-condensation, they cause a crosslinking reaction with the dispersant, and in a case where a crosslinkable substituent is present in the dispersant, the crosslinkable substituent promotes the crosslinking reaction.

The solvent used for preparing the composition of the present invention is not particularly limited, and examples of the solvent include water and hydrophilic solvents. Hydrophilic solvents are organic solvents that arbitrarily mix with water, and examples thereof include organic solvents including ethers such as tetrahydrofuran (THF), amides such as N,N-dimethylformamide (DMF), N,N-dimethylacetamide (DMAc), and N-methyl-2-pyrrolidone (NMP), ketones such as acetone, alcohols such as methanol, ethanol, n-propanol, and isopropanol, glycol ethers such as ethylene glycol monoethyl ether, ethylene glycol monobutyl ether, and propylene glycol monomethyl ether, and glycols such as ethylene glycol and propylene glycol. These solvents can be used singly or in combination of two or more kinds thereof. Particularly preferable solvents are water, NMP, DMF, THF, methanol, ethanol, n-propanol, isopropanol, n-butanol, and t-butanol from the viewpoint of increasing the proportion of the CNT discretely dispersed. From the viewpoint of improving the coatability, solvents preferably included are methanol, ethanol, n-propanol, isopropanol, n-butanol, t-butanol, and ethylene glycol monobutyl ether. From the viewpoint of lowering the cost, water is preferably included. These solvents can be used singly or in combination of two or more kinds thereof for the purpose of increasing the proportion of discrete dispersion, improving the coatability, and lowering the cost.

A polymer that serves as a matrix may be added to the composition of the present invention. Examples of the matrix polymer include thermoplastic resins including fluorine-based resins such as polyvinylidene fluoride (PVdF), polytetrafluoroethylene, tetrafluoroethylene-hexafluoropropylene copolymers, vinylidene fluoride-hexafluoropropylene copolymers [P(VDF-HFP)], and vinylidene fluoride-chlorotrifluoroethylene copolymers [P(VDF-CTFE)], polyolefin-based resins such as polyvinylpyrrolidone, ethylene-propylene-diene ternary copolymers, polyethylene (PE), polypropylene (PP), ethylene-vinyl acetate copolymers (EVA), and ethylene-ethyl acrylate copolymers (EEA), polystyrene-based resins such as polystyrene (PS), high-impact polystyrene (HIPS), acrylonitrile-styrene copolymers (AS), acrylonitrile-butadiene-styrene copolymers (ABS), methyl methacrylate-styrene copolymers (MS), and styrene-butadiene rubber, polycarbonate resins, vinyl chloride resins, polyamide resins, polyimide resins, (meth) acrylic resins such as sodium polyacrylate and polymethyl methacrylate (PMMA), polyester resins such as polyethylene terephthalate (PET), polybutylene terephthalate, polyethylene naphthalate, polybutylene naphthalate, polylactic acid (PLA), poly-3-hydroxybutyric acid, polycaprolactone, polybutylene succinate, and polyethylene succinate/adipate, polyphenylene ether resins, modified polyphenylene ether resins, polyacetal resins, polysulfone resins, polyphenylene sulfide resins, polyvinyl alcohol resins, polyglycolic acids, modified starches, cellulose acetate, carboxymethylcellulose, cellulose triacetate, chitin, chitosan, and lignin; electrically conductive polymers including polyaniline and emeraldine base as the semi-oxidized form of polyaniline, polythiophene, polypyrrole, polyphenylene vinylene, polyphenylene, and polyacetylene; and thermosetting resins and photo-curing resins including epoxy resins, urethane acrylate, phenolic resins, melamine resins, urea resins, and alkyd resins. Among them, polymers that are also water-soluble in the form of a matrix polymer are suitable because in the conductive carbon material dispersion of the present invention, water is preferably used as the solvent. Examples of such polymers include sodium polyacrylate, carboxymethylcellulose sodium, water-soluble cellulose ether, sodium alginate, polyvinyl alcohol, polystyrene sulfonic acid, and polyethylene glycol, and polyacrylic acid, carboxymethylcellulose sodium, and the like are particularly suitable.

The matrix polymer can be acquired as a commercially available product. Examples of the commercially available product include sodium polyacrylate (manufactured by FUJIFILM Wako Pure Chemical Corporation, degree of polymerization: 2,700 to 7,500), carboxymethylcellulose sodium (manufactured by FUJIFILM Wako Pure Chemical Corporation), sodium alginate (manufactured by KANTO CHEMICAL CO., INC., Cica first grade), the METOLOSE SH series (hydroxypropylmethyl cellulose, manufactured by Shin-Etsu Chemical Co., Ltd.), the METOLOSE SE series (hydroxyethylmethyl cellulose, manufactured by Shin-Etsu Chemical Co., Ltd.), JC-25 (a fully saponified polyvinyl alcohol, manufactured by JAPAN VAM & POVAL CO., LTD.), JM-17 (an intermediately saponified polyvinyl alcohol, manufactured by JAPAN VAM & POVAL CO., LTD.), JP-03 (a partially saponified polyvinyl alcohol, manufactured by JAPAN VAM & POVAL CO., LTD.), and polystyrene sulfonic acid (manufactured by Aldrich, solid content concentration: 18 wt %, aqueous solution).

In the case of adding a matrix polymer, the amount of the matrix polymer added is not particularly limited, but is preferably about 0.0001 to 99 wt %, and more preferably about 0.001 to 90 wt % in the composition.

The method of preparing the composition of the present invention is not particularly limited, and a dispersion is to be prepared by mixing a CNT, a dispersant, a solvent, a P1 polymer, a matrix polymer used as necessary, and the like in any order. At this time, in a case where the P1 polymer has crosslinking reactive groups such as a carboxy group and an unintended crosslinking reaction may occur between the crosslinking reactive groups and the dispersant, a part or all of the crosslinking reactive groups may be neutralized with a base such as ammonia. Furthermore, the mixture is preferably subjected to dispersion treatment, and this treatment can increase the proportion of the CNT dispersed. Examples of the dispersion treatment include mechanical treatment including wet treatment using a ball mill, a bead mill, a jet mill, or the like and ultrasonic treatment using a bath-type or probe-type sonicator, and wet treatment using a jet mill and ultrasonic treatment are suitable.

The dispersion treatment may be performed for an optional time, but the time is preferably about 1 minute to 10 hours, and more preferably about 5 minutes to 5 hours. At this time, heat treatment may be performed as necessary.

In the case of using optional components such as a matrix polymer, the optional components may be added after preparing a mixture including a CNT, a dispersant, and a solvent.

In the present invention, the solid content concentration of the composition is not particularly limited, but is preferably 20 wt % or less, more preferably 15 wt % or less, still more preferably 10 wt % or less, and still even more preferably 5 wt % or less in consideration of forming an undercoat layer with a desired coating weight and film thickness. The solid content concentration may have any lower limit, but the lower limit is preferably 0.1 wt % or more, more preferably 0.5 wt % or more, and still more preferably 1 wt % or more from a practical viewpoint.

The solid content is the total amount of the components, other than the solvent, included in the composition.

The above-described composition is applied to at least one side of a current collector and dried naturally or by heating to form an undercoat layer, and thus an undercoat foil (composite current collector) can be produced.

As the current collector, a current collector can be used that is conventionally used in an electrode for energy storage devices. For example, copper, aluminum, titanium, stainless steel, nickel, gold, silver, an alloy thereof, a carbon material, a metal oxide, a conductive polymer, or the like can be used. In the case of producing an electrode structure by welding such as ultrasonic welding, a metal foil is preferably used that includes copper, aluminum, titanium, stainless steel, or an alloy thereof. The thickness of the current collector is not particularly limited, but is preferably 1 to 100 μm in the present invention.

Examples of the method of applying the composition include a spin coating method, a dip coating method, a flow coating method, an inkjet method, a casting method, a spray coating method, a bar coating method, a gravure coating method, a slit coating method, a roll coating method, a flexographic printing method, a transfer printing method, brush coating, a blade coating method, an air knife coating method, and a die coating method. From the viewpoint of work efficiency and the like, suitable methods are an inkjet coating method, a casting method, a dip coating method, a bar coating method, a blade coating method, a roll coating method, a gravure coating method, a flexographic printing method, a spray coating method, and a die coating method. The heating and drying may be performed at an optional temperature, but the temperature is preferably about 50 to 200° C., and more preferably about 80 to 150° C.

The thickness of the undercoat layer is preferably 1 nm to 10 μm, more preferably 1 nm to 1 μm, and still more preferably 1 to 500 nm in consideration of reducing the internal resistance of a device to be obtained. The thickness of the undercoat layer can be determined by, for example, cutting out a test specimen having a suitable size from the undercoat foil, exposing the section of the specimen with a method such as tearing the specimen by hand, and observing the sectional portion where the undercoat layer is exposed with a scanning electron microscope (SEM) or the like.

The coating weight of the undercoat layer per side of the current collector is not particularly limited as long as the above-described film thickness is satisfied, but is preferably 1,000 mg/m$^2$ or less, more preferably 500 mg/m$^2$ or less, still more preferably 300 mg/m$^2$ or less, and still even more preferably 200/m$^2$ or less. Meanwhile, in order to ensure the function of the undercoat layer and obtain a battery having excellent characteristics with good reproducibility, the coating weight of the undercoat layer per side of the current collector is preferably 1 mg/m$^2$ or more, more preferably 5 mg/m$^2$ or more, still more preferably 10 mg/m$^2$ or more, and still even more preferably 15 mg/m$^2$ or more.

The coating weight of the undercoat layer refers to the ratio of the weight (mg) of the undercoat layer to the area (m$^2$) of the undercoat layer. In the case of an undercoat layer formed in a pattern, the area of the undercoat layer is the area of the undercoat layer alone and does not include the area of the current collector exposed within the undercoat layer formed in the pattern.

The weight of the undercoat layer can be determined by, for example, cutting out a test specimen having a suitable size from the undercoat foil and measuring the weight of the specimen (W0), then stripping the undercoat layer from the undercoat foil and measuring the weight after the stripping of the undercoat layer (W1), and calculating the difference between W0 and W1 (W0−W1). Alternatively, the weight of the undercoat layer can be determined by measuring the weight of the current collector (W2) in advance, then measuring the weight of the undercoat foil after forming the undercoat layer (W3), and calculating the difference between W2 and W3 (W3−W2). Examples of the method of stripping the undercoat layer include a method in which the undercoat layer is immersed in a solvent that dissolves or swells the undercoat layer, and wiped off with a cloth or the like.

The coating weight and the film thickness can be adjusted with a known method. For example, in the case of forming an undercoat layer by coating, the coating weight and the film thickness can be adjusted by varying the solid content concentration of the coating slurry used to form the undercoat layer (composition for formation of the undercoat layer), the number of coating passes, the clearance of the coating slurry delivery opening in the coater, or the like. When the coating weight and the film thickness are to be increased, the solid content concentration, the number of coating passes, or the clearance is increased. When the coating weight and the film thickness are to be reduced, the solid content concentration, the number of coating passes, or the clearance is reduced.

The electrode for energy storage devices of the present invention can be produced by forming an electrode mixture layer on the undercoat layer. Examples of the energy storage device in the present invention include various energy storage devices including electrical double-layer capacitors, lithium secondary batteries, lithium-ion secondary batteries, proton polymer batteries, nickel-hydrogen batteries, aluminum solid capacitors, electrolytic capacitors, and lead storage batteries. The undercoat foil of the present invention can be particularly suitably used in electrical double-layer capacitors and lithium-ion secondary batteries.

The electrode mixture layer can be formed by applying an electrode slurry produced by mixing an active material, a binder polymer, and if necessary, a solvent to the undercoat layer, and drying the electrode slurry naturally or by heating.

As the active material, various active materials can be used that are conventionally used in an electrode for energy storage devices. In the case of lithium secondary batteries and lithium-ion secondary batteries, compounds capable of intercalating and deintercalating lithium ions can be used as the positive electrode active material, and examples of such compounds include chalcogen compounds, lithium ion-containing chalcogen compounds, polyanionic compounds, elemental sulfur, and sulfur compounds.

Examples of the chalcogen compounds capable of intercalating and deintercalating lithium ions include $FeS_2$, $TiS_2$, $MoS_2$, $V_2O_6$, $V_6O_{13}$, and $MnO_2$.

Examples of the lithium ion-containing chalcogen compounds include $LiCoO_2$, $LiMnO_2$, $LiMn_2O_4$, $LiMo_2O_4$, $LiV_3O_8$, $LiNiO_2$, and $Li_xNi_yM_{1-y}O_2$ (provided that M represents at least one metal element selected from Co, Mn, Ti, Cr, V, Al, Sn, Pb, and Zn, $0.05 \leq x \leq 1.10$, and $0.5 \leq y \leq 1.0$).

Examples of the polyanionic compounds include $LiFePO_4$.

Examples of the sulfur compounds include $Li_2S$ and rubeanic acid.

As the negative electrode active material included in the negative electrode, the following materials can be used: alkali metals, alkali alloys, at least one elemental substance selected from Group 4 to Group 15 elements in the periodic table that intercalate and deintercalate lithium ions, and oxides, sulfides, and nitrides of the at least one elemental substance, and carbon materials capable of reversibly intercalating and deintercalating lithium ions.

Examples of the alkali metals include Li, Na, and K, and examples of the alkali metal alloys include Li—Al, Li—Mg, Li—Al—Ni, Na—Hg, and Na—Zn.

Examples of the at least one elemental substance selected from Group 4 to Group 15 elements in the periodic table that intercalate and deintercalate lithium ions include silicon, tin, aluminum, zinc, and arsenic.

Examples of the oxides of the at least one elemental substance include silicon monoxide (SiO), silicon dioxide ($SiO_2$), tin silicon oxide ($SnSiO_3$), lithium bismuth oxide ($Li_3BiO_4$), lithium zinc oxide ($Li_2ZnO_2$), lithium titanium oxide ($Li_4Ti_5O_{12}$), and titanium oxide.

Examples of the sulfides of the at least one elemental substance include lithium iron sulfides ($Li_xFeS_2$ ($0 \leq x \leq 3$)) and lithium copper sulfides ($Li_xCuS$ ($0 \leq x \leq 3$)).

Examples of the nitrides of the at least one elemental substance include lithium-containing transition metal nitrides, and specific examples thereof include $Li_xM_yN$ (M=Co, Ni, Cu, $0 \leq x \leq 3$, $0 \leq y \leq 0.5$) and lithium iron nitride ($Li_3FeN_4$).

Examples of the carbon materials capable of reversibly intercalating and deintercalating lithium ions include graphite, carbon black, coke, glassy carbon, carbon fibers, carbon nanotubes, and sintered bodies thereof.

In the case of an electrical double-layer capacitor, a carbonaceous material can be used as the active material.

Examples of the carbonaceous material include activated carbon, including activated carbon obtained by carbonizing a phenol resin and then subjecting the resulting carbonized resin to activation treatment.

The binder polymer can be appropriately selected for use from known materials, and examples of the binder polymer include polyvinylidene fluoride (PVdF), polyvinylpyrrolidone, polytetrafluoroethylene, tetrafluoroethylene-hexafluoropropylene copolymers, vinylidene fluoride-hexafluoropropylene copolymers [P(VDF-HFP)], vinylidene fluoride-chlorotrifluoroethylene copolymers [P(VDF-CTFE)], polyvinyl alcohols, polyimides, ethylene-propylene-diene ternary copolymers, styrene-butadiene rubber, carboxymethylcellulose (CMC), polyacrylic acid (PAA), polyaniline, polyimides, and polyamides. The amount of the binder polymer added is preferably 0.1 to 40 parts by weight, and particularly preferably 1 to 30 parts by weight per 100 parts by weight of the active material.

The solvent is exemplified by the solvents described as examples of the solvent for the composition, and is to be appropriately selected from them according to the kind of the binder, but NMP is suitable in the case of a water-insoluble binder such as PVdF, and water is suitable in the case of a water-soluble binder such as PAA.

The electrode slurry may contain a conductive material. Examples of the conductive material include carbon black, Ketjen black, acetylene black, carbon whiskers, carbon fibers, natural graphite, synthetic graphite, titanium oxide, ruthenium oxide, aluminum, and nickel.

Examples of the method of applying the electrode slurry include the same methods as those described above as examples of the method of applying the composition.

The heating and drying may be performed at an optional temperature, but the temperature is preferably about 50 to 400° C., and more preferably about 80 to 150° C.

The electrode may be pressed as necessary. At this time, the pressing pressure is preferably 30 kN/cm or less. As the pressing method, a generally employed method can be used, but a mold pressing method and a roll pressing method are particularly preferable. The pressing pressure is not particularly limited, but is preferably 10 kN/cm or less, and more preferably 5 kN/cm or less.

The energy storage device according to the present invention includes the above-described electrode for energy storage devices, and more specifically, includes at least one pair of positive and negative electrodes, a separator interposed between the electrodes, and an electrolyte, and at least one of the positive or negative electrode includes the above-described electrode for energy storage devices.

This energy storage device is characterized by using the above-described electrode for energy storage devices as an electrode, so that other device constituent members such as the separator and the electrolyte can be appropriately selected for use from known materials. Examples of the separator include cellulose-based separators and polyolefin-based separators.

The electrolyte may be liquid or solid, and may be aqueous or non-aqueous, and the electrode for energy storage devices of the present invention can exhibit practically sufficient performance even when applied to a device using a non-aqueous electrolyte. Examples of the non-aqueous electrolyte include non-aqueous electrolyte solutions obtained by dissolving an electrolyte salt in a non-aqueous organic solvent.

Examples of the electrolyte salt include lithium salts such as lithium tetrafluoroborate, lithium hexafluorophosphate, lithium perchlorate, and lithium trifluoromethanesulfonate, quaternary ammonium salts such as tetramethylammonium hexafluorophosphate, tetraethylammonium hexafluorophosphate, tetrapropylammonium hexafluorophosphate, methyltriethylammonium hexafluorophosphate, tetraethylammonium tetrafluoroborate, and tetraethylammonium perchlorate, and lithium imides such as lithium bis(trifluoromethanesulfonyl)imide and lithium bis(fluorosulfonyl)imide.

Examples of the non-aqueous organic solvent include alkylene carbonates such as propylene carbonate, ethylene carbonate, and butylene carbonate, dialkyl carbonates such as dimethyl carbonate, methyl ethyl carbonate, and diethyl carbonate, nitriles such as acetonitrile, and amides such as dimethylformamide.

The configuration of the energy storage device is not particularly limited, and cells of various known configurations such as cylindrical cells, flat wound prismatic cells, stacked prismatic cells, coin cells, flat wound laminate cells, and stacked laminate cells can be employed.

In the case of application to a coil cell, the electrode for energy storage devices of the present invention is to be punched into a predetermined disk shape and used. For example, a lithium ion secondary battery can be produced by setting one electrode on a coin cell cap to which a washer and a spacer are welded, superimposing an electrolyte solution-impregnated separator having the same shape on the electrode, further superimposing, on the separator, the electrode for energy storage devices of the present invention with the electrode mixture layer facing down, placing a case and a gasket thereon, and sealing the resulting product with a coin cell crimper.

In the case of application to a stacked laminate cell, an electrode structure is to be used that includes an electrode in which an electrode mixture layer is formed on a part or the whole of the surface of the undercoat layer and a metal tab is welded to the portion where the electrode mixture layer is not formed (welding portion). In this case, the electrode structure may include one electrode or a plurality of electrodes, but generally includes a plurality of positive electrodes and a plurality of negative electrodes. The plurality of electrodes used to form the positive electrode are preferably stacked alternately with the plurality of electrodes used to form the negative electrode, and at this time, the above-described separator is preferably interposed between the positive electrode and the negative electrode.

The metal tab may be welded to the welding portion of the outermost electrode in the plurality of electrodes, or may be sandwiched between and welded to the welding portions of any two adjacent electrodes in the plurality of electrodes. The material of the metal tab is not particularly limited as long as the material is generally used in energy storage devices. Examples of the material include metals such as nickel, aluminum, titanium, and copper and alloys such as stainless steel, nickel alloys, aluminum alloys, titanium alloys, and copper alloys, and in consideration of welding efficiency, alloys including at least one metal selected from aluminum, copper, and nickel is preferable. The shape of the metal tab is preferably a foil shape, and the thickness of the metal tab is preferably about 0.05 to 1 mm.

As the welding method, known methods for welding metals can be used. Specific examples of the method include TIG welding, spot welding, laser welding, and ultrasonic welding, and ultrasonic welding is preferably used for joining the electrode and the metal tab together. Examples of the method of ultrasonic welding include a method in which a plurality of electrodes are placed between an anvil and a horn, a metal tab is placed at the welding portions, and ultrasonic waves are applied to the welding portions to perform welding at once, and a method in which electrodes are welded first, and then a metal tab is welded.

In the present invention, in any method, not only the metal tab and the electrode are welded at the welding portion, but also the plurality of electrodes are ultrasonically welded to each other. The pressure, the frequency, the output, the treatment time, and the like at the time of welding are not particularly limited, and are to be appropriately set in consideration of the material to be used, the presence or absence of the undercoat layer, the coating weight, and the like.

The electrode structure produced as described above is housed in a laminate pack, the above-described electrolyte solution is injected, and then the resulting product is heat-sealed to obtain a laminate cell.

EXAMPLES

Hereinafter, the present invention is more specifically described with reference to Examples and Comparative Examples, but the present invention is not limited to the following Examples. The devices used are as follows.
(1) Lyophilizer (drying of compound)
  FDU-2100 manufactured by EYELA
(2) Probe-type ultrasonicator
  UIP1000 manufactured by Hielscher Ultrasonics GmbH
(3) Wire bar coater (formation of undercoat layer)
  PM-9050MC manufactured by SMT Co., Ltd.
(4) Homogenizing disperser (mixing of electrode slurry)
  T. K. ROBOMIX (with Homogenizing Disperser model 2.5 (32 mm dia.)) manufactured by PRIMIX Corporation
(5) Bead mill (mixing of electrode slurry)
  FREQROL-E500 manufactured by Mitsubishi Electric Corporation
(6) Thin-film spin-type high-speed mixer (mixing of electrode slurry)
  FILMIX Model 40 manufactured by PRIMIX Corporation
(7) Rotation/revolution mixer (degassing of electrode slurry)
  THINKY MIXER (ARE-310) manufactured by THINKY CORPORATION
(8) Roll press (compression of electrode)
  SA-602 manufactured by TAKUMI GIKEN
(9) Adhesion/film peeling analysis device (measurement of adhesion strength)
  VPA-3 manufactured by Kyowa Interface Science Co., Ltd.
(10) Ultrasonic welding machine (welding of electrode tab)
  2000× manufactured by Emerson Japan, Ltd.
(11) Tabletop manual sealer for thick gusset bag (sealing of laminate cell)
  T-230K manufactured by FUJIIMPULSE CO., LTD.
(12) Vacuum packing machine (vacuum sealing of laminate cell)
  V-307G II manufactured by TOSEI CORPORATION
(13) Charge/discharge measurement device (evaluation of secondary battery)
  580 battery test system manufactured by Scribner Associates Inc.
(14) Size exclusion chromatography (SEC) (estimation of weight average molecular weight)
  High performance liquid chromatograph Prominence manufactured by SHIMADZU CORPORATION
  Eluent: 5 mM sodium tetraborate decahydrate (pH 9.3)
  Column: TSK gel α6000 manufactured by Tosoh Corporation+TSK gel α4000 manufactured by Tosoh Corporation
  Column temperature: 40° C.
  Detector: UV (210 nm)
  Flow rate: 0.5 mL/min
  Sample concentration: 0.1% (10 μL injection)
[1-1] Synthesis of P1 Polymer

[Synthesis Example 1] Synthesis of Compound 1

In NMP, 2.50 g of ISOBAM 10 (manufactured by Kuraray Co., Ltd., Mw: 160,000 to 170,000 (catalog value)) was stirred at 80° C., and after confirming that ISOBAM 10 was dissolved, the resulting solution was cooled to 40° C. A mixture of 3.31 g (2 mol per 1 mol of the repeating unit of ISOBAM 10) of N,N-dimethyl-1,3-propanediamine (manufactured by Tokyo Chemical Industry Co., Ltd.) and 29.80 g of NMP was added dropwise and reacted at 80° C. for 3 and a half hours while the mixture was stirred. After the reaction, the resulting mixture was cooled to 40° C., 1.62 g of aqueous ammonia (28%) (manufactured by JUNSEI CHEMICAL CO., LTD., JUNSEI first grade) was added, and the resulting mixture was stirred for 1 hour to obtain a polymer solution. After reprecipitation with 2-butanone (manufactured by JUNSEI CHEMICAL CO., LTD., JUNSEI first grade): hexane (manufactured by JUNSEI CHEMICAL CO., LTD., special grade)=3:5 (weight ratio), filtration under reduced pressure was performed. After redissolution in water, dialysis was performed with a dialysis membrane (manufactured by FUJIFILM Wako Pure Chemical Corporation, size 36) for 1 week, and freeze-drying was performed for 15 hours or more to obtain a compound 1.

[Synthesis Example 2] Synthesis of Compound 2

In NMP, 2.50 g of ISOBAM 10 (manufactured by Kuraray Co., Ltd., Mw: 160,000 to 170,000 (catalog value)) was stirred at 80° C., and after confirming that ISOBAM 10 was dissolved, the resulting solution was cooled to 40° C. A mixture of 4.06 g (2 mol per 1 mol of the repeating unit of ISOBAM 10) of 1-(3-aminopropyl)imidazole (manufactured by Tokyo Chemical Industry Co., Ltd.) and 36.50 g of NMP was added dropwise and reacted at 80° C. for 3 and a half hours while the mixture was stirred. After the reaction, the resulting mixture was cooled to 40° C., 1.62 g of aqueous ammonia (28%) (manufactured by JUNSEI CHEMICAL CO., LTD., JUNSEI first grade) was added, and the resulting mixture was stirred for 1 hour to obtain a polymer solution. After reprecipitation with 2-butanone (manufactured by JUNSEI CHEMICAL CO., LTD., JUNSEI first grade):hexane (manufactured by JUNSEI CHEMICAL CO., LTD., special grade)=3:5 (weight ratio), filtration under reduced pressure was performed. After redissolution in water, dialysis was performed with a dialysis membrane (manufactured by FUJIFILM Wako Pure Chemical Corporation, size 36) for 1 week, and freeze-drying was performed for 15 hours or more to obtain a compound 2.

[Synthesis Example 3] Synthesis of Compound 3

In NMP, 2.50 g of ISOBAM 18 (manufactured by Kuraray Co., Ltd., Mw: 300,000 to 350,000 (catalog value)) was stirred at 80° C., and after confirming that ISOBAM 18 was dissolved, the resulting solution was cooled to 40° C. A mixture of 3.31 g (2 mol per 1 mol of the repeating unit of ISOBAM 18) of N,N-dimethyl-1,3-propanediamine (manufactured by Tokyo Chemical Industry Co., Ltd.) and 29.80 g of NMP was added dropwise and reacted at 80° C. for 3 and a half hours while the mixture was stirred. After the reaction, the resulting mixture was cooled to 40° C., 1.62 g of aqueous ammonia (28%) (manufactured by JUNSEI CHEMICAL CO., LTD., JUNSEI first grade) was added, and the resulting mixture was stirred for 1 hour to obtain a polymer solution. After reprecipitation with 2-butanone (manufactured by JUNSEI CHEMICAL CO., LTD., JUNSEI first grade):hexane (manufactured by JUNSEI CHEMICAL CO., LTD., special grade)=3:5 (weight ratio), filtration under reduced pressure was performed. After redissolution in water, dialysis was performed with a dialysis membrane (manufactured by FUJIFILM Wako Pure Chemical Corporation, size 36) for 1 week, and freeze-drying was performed for 15 hours or more to obtain a compound 3.

[1-2] Preparation of Conductive Carbon Material Dispersion

[Preparation Example 1] Preparation of Dispersion 1

A mixture was prepared of 0.5 g (100 parts by weight) of TC-2010 (multilayer CNT manufactured by TODA KOGYO CORP.) as a conductive carbon material, 5.0 g (100 parts by weight) of WS-300 (manufactured by NIPPON SHOKUBAI CO., LTD., solid content concentration: 10.0 wt %) as an aqueous solution containing an oxazoline polymer, 37.15 g of pure water, and 7.35 g of 2-propanol (manufactured by JUNSEI CHEMICAL CO., LTD., special grade). The obtained mixture was subjected to ultrasonic treatment for 30 minutes using a probe-type ultrasonicator to prepare a dispersion 1 in which the conductive carbon material was uniformly dispersed.

[Preparation Example 2] Preparation of Dispersion 2

A mixture was prepared of 0.5 g (100 parts by weight) of TC-2010 (multilayer CNT manufactured by TODA KOGYO CORP.) as a conductive carbon material, 2.0 g (100 parts by weight) of WS-700 (manufactured by NIPPON SHOKUBAI CO., LTD., solid content concentration: 25.0 wt %) as an aqueous solution containing an oxazoline polymer, 40.15 g of pure water, and 7.35 g of 2-propanol (manufactured by JUNSEI CHEMICAL CO., LTD., special grade). The obtained mixture was subjected to ultrasonic treatment for 30 minutes using a probe-type ultrasonicator to prepare a dispersion 2 in which the conductive carbon material was uniformly dispersed.

[Preparation Example 3] Preparation of Dispersion 3

A mixture was prepared of 0.5 g (100 parts by weight) of FloTube 6121 (multilayer CNT manufactured by Jiangsu Cnano Technology Co., Ltd.) as a conductive carbon material, 5.0 g (100 parts by weight) of WS-300 (manufactured by NIPPON SHOKUBAI CO., LTD., solid content concentration: 10.0 wt %) as an aqueous solution containing an oxazoline polymer, 37.15 g of pure water, and 7.35 g of 2-propanol (manufactured by JUNSEI CHEMICAL CO., LTD., special grade). The obtained mixture was subjected to ultrasonic treatment for 30 minutes using a probe-type ultrasonicator to prepare a dispersion 3 in which the conductive carbon material was uniformly dispersed.

[Preparation Example 4] Preparation of Dispersion 4

A mixture was prepared of 0.5 g (100 parts by weight) of FloTube 6121 (multilayer CNT manufactured by Jiangsu Cnano Technology Co., Ltd.) as a conductive carbon material, 2.0 g (100 parts by weight) of WS-700 (manufactured by NIPPON SHOKUBAI CO., LTD., solid content concentration: 25.0 wt %) as an aqueous solution containing an oxazoline polymer, 40.15 g of pure water, and 7.35 g of 2-propanol (manufactured by JUNSEI CHEMICAL CO., LTD., special grade). The obtained mixture was subjected to ultrasonic treatment for 30 minutes using a probe-type ultrasonicator to prepare a dispersion 4 in which the conductive carbon material was uniformly dispersed.

[Preparation Example 5] Preparation of Dispersion 5

A highly branched polymer (PTPA) was synthesized in accordance with the method of Synthesis Example 1 in WO 2014/042080. A mixture was prepared of 0.5 g (100 parts by weight) of TC-2010 (multilayer CNT manufactured by TODA KOGYO CORP.) as a conductive carbon material, 0.5 g (100 parts by weight) of PTPA, 39.20 g of N-methylpyrrolidone (NMP) (manufactured by JUNSEI CHEMICAL CO., LTD., special grade), and 9.80 g of butyl cellosolve (manufactured by JUNSEI CHEMICAL CO., LTD., special grade). The obtained mixture was subjected to ultrasonic treatment for 30 minutes using a probe-type ultrasonicator to prepare a dispersion 5 in which the conductive carbon material was uniformly dispersed.

[1-3] Preparation of Thin Film Forming Composition

Example 1-1

In the dispersion 1, 50 parts by weight of the compound 1, pure water, and 2-propanol (manufactured by JUNSEI CHEMICAL CO., LTD., special grade) were mixed to prepare a thin film forming composition A1 having a solid content concentration of 1 wt %. At this time, the solvents were finally mixed at a mixing ratio of pure water:2-propanol=92:8 (weight ratio). The thin film forming composition A1 was a black ink in which the CNT was uniformly dispersed.

Examples 1-2 to 1-4

Thin film forming compositions A2 to A4 were prepared in the same manner as in Example 1-1 except that the compounding amount of the P1 polymer was changed as shown in Table 1 and the solid content concentration was adjusted to 1 wt %. All of the thin film forming compositions A2 to A4 were a black ink in which the CNT was uniformly dispersed.

Table 1 summarizes the compositions of the thin film forming compositions A1 to A4.

TABLE 1

|  | Thin film forming composition | Solid content concentration (wt %) | Composition (parts by weight) | | |
| --- | --- | --- | --- | --- | --- |
|  |  |  | P1 polymer Compound 1 | Dispersant WS-300 | Conductive material TC-2010 |
| Example 1-1 | A1 | 1 | 50 | 100 | 100 |
| Example 1-2 | A2 | 1 | 100 | 100 | 100 |
| Example 1-3 | A3 | 1 | 200 | 100 | 100 |
| Example 1-4 | A4 | 1 | 500 | 100 | 100 |

Example 2-1

A thin film forming composition B1 having a solid content concentration of 1 wt % was prepared by mixing 100 parts by weight of the compound 1, 50 parts by weight of Aron A-30 (manufactured by Toagosei Co., Ltd., solid content concentration: 31.6 wt %) as a crosslinking agent, pure water, and 2-propanol (manufactured by JUNSEI CHEMICAL CO., LTD., special grade). The solvents were finally mixed at a mixing ratio of pure water:2-propanol=92:8 (weight ratio).

Example 2-2

A thin film forming composition B2 was prepared in the same manner as in Example 2-1 except that the compounding amount of Aron A-30 was changed to 100 parts by weight and the solid content concentration was adjusted to 1 wt %.

Table 2 summarizes the compositions of the thin film forming compositions B1 and B2.

TABLE 2

|  | Thin film forming composition | Solid content concentration (wt %) | Composition (parts by weight) | | | |
| --- | --- | --- | --- | --- | --- | --- |
|  |  |  | P1 polymer Compound 1 | Crosslinking agent Aron A-30 | Dispersant WS-300 | Conductive material TC-2010 |
| Example 2-1 | B1 | 1 | 100 | 50 | 100 | 100 |
| Example 2-2 | B2 | 1 | 100 | 100 | 100 | 100 |

Example 3-1

A thin film forming composition C1 was prepared in the same manner as in Example 1-4 except that the compound 1 was changed to the compound 2.

Table 3 summarizes the composition of the thin film forming composition C1.

TABLE 3

|  | Thin film forming composition | Solid content concentration (wt %) | Composition (parts by weight) | | |
|---|---|---|---|---|---|
|  |  |  | P1 polymer Compound 2 | Dispersant WS-300 | Conductive material TC-2010 |
| Example 3-1 | C1 | 1 | 500 | 100 | 100 |

Comparative Example 1-1

A thin film forming composition a1 was prepared in the same manner as in Example 1-1 except that the compound 1 was changed to ISOBAM 110 (manufactured by Kuraray Co., Ltd.).

Comparative Examples 1-2 to 1-4

Thin film forming compositions a2 to a4 were prepared in the same manner as in Comparative Example 1-1 except that the compound 2 was changed to ISOBAM 110 as a comparative product of the P1 polymer, the compounding amount of ISOBAM 110 was changed as shown in Table 4, and the solid content concentration was adjusted to 1 wt %.

Table 4 summarizes the compositions of the thin film forming compositions a1 to a4.

TABLE 4

|  | Thin film forming composition | Solid content concentration (wt %) | Composition (parts by weight) | | |
|---|---|---|---|---|---|
|  |  |  | Comparative product ISOBAM 110 | Dispersant WS-300 | Conductive material TC-2010 |
| Comparative Example 1-1 | a1 | 1 | 50 | 100 | 100 |
| Comparative Example 1-2 | a2 | 1 | 100 | 100 | 100 |
| Comparative Example 1-3 | a3 | 1 | 200 | 100 | 100 |
| Comparative Example 1-4 | a4 | 1 | 500 | 100 | 100 |

Comparative Example 2-1

In the dispersion 1, 76 parts by weight of Aron A-30, pure water, and 2-propanol (manufactured by JUNSEI CHEMICAL CO., LTD., special grade) were mixed to prepare a thin film forming composition b1 having a solid content concentration of 1 wt %. The solvents were finally mixed at a mixing ratio of pure water:2-propanol=85:15 (weight ratio).

Comparative Example 2-2

A thin film forming composition b2 was prepared in the same manner as in Comparative Example 2-1 except that the compounding amount of Aron A-30 was changed to 500 parts by weight and the solid content concentration was adjusted to 1 wt %. The solvents were finally mixed at a mixing ratio of pure water:2-propanol=92:8 (weight ratio).

Comparative Example 2-3

A thin film forming composition b3 was prepared in the same manner as in Comparative Example 2-1 except that in the dispersion 1 free of Aron A-30, pure water and 2-propanol (manufactured by JUNSEI CHEMICAL CO., LTD., special grade) were mixed and the solid content concentration was set to 1 wt %. The solvents were finally mixed at a mixing ratio of pure water:2-propanol=92:8 (weight ratio).

Table 5 summarizes the compositions of the thin film forming compositions b1 to b3.

TABLE 5

|  | Thin film forming composition | Solid content concentration (wt %) | Composition (parts by weight) | | |
|---|---|---|---|---|---|
|  |  |  | Crosslinking agent Aron A-30 | Dispersant WS-300 | Conductive material TC-2010 |
| Comparative Example 2-1 | b1 | 1 | 76 | 100 | 100 |
| Comparative Example 2-2 | b2 | 1 | 500 | 100 | 100 |
| Comparative Example 2-3 | b3 | 1 |  | 100 | 100 |

Example 4-1

In the dispersion 2, 50 parts by weight of the compound 1, pure water, and 2-propanol (manufactured by JUNSEI CHEMICAL CO., LTD., special grade) were mixed to prepare a thin film forming composition D1 having a solid content concentration of 1 wt %. The solvents were finally mixed at a mixing ratio of pure water:2-propanol=92:8 (weight ratio).

Examples 4-2 to 4-4

Thin film forming compositions D2 to D4 were prepared in the same manner as in Example 4-1 except that the compounding amount of the P1 polymer was changed as shown in Table 5 and the solid content concentration was adjusted to 1 wt %.

Table 6 summarizes the compositions of the thin film forming compositions D1 to D4.

TABLE 6

| | Thin film forming composition | Solid content concentration (wt %) | Composition (parts by weight) | | |
|---|---|---|---|---|---|
| | | | P1 polymer Compound 1 | Dispersant WS-700 | Conductive material TC-2010 |
| Example 4-1 | D1 | 1 | 50 | 100 | 100 |
| Example 4-2 | D2 | 1 | 100 | 100 | 100 |
| Example 4-3 | D3 | 1 | 200 | 100 | 100 |
| Example 4-4 | D4 | 1 | 500 | 100 | 100 |

Comparative Example 3-1

In the dispersion 2, 44 parts by weight of Aron A-30, pure water, and 2-propanol (manufactured by JUNSEI CHEMICAL CO., LTD., special grade) were mixed to prepare a thin film forming composition c1 having a solid content concentration of 1 wt %. The solvents were finally mixed at a mixing ratio of pure water:2-propanol=85:15 (weight ratio).

Comparative Example 3-2

A thin film forming composition c2 was prepared in the same manner as in Comparative Example 2-1 except that the compounding amount of Aron A-30 was changed to 500 parts by weight and the solid content concentration was adjusted to 1 wt %. The solvents were finally mixed at a mixing ratio of pure water:2-propanol=92:8 (weight ratio).

Table 7 summarizes the compositions of the thin film forming compositions c1 and c2.

TABLE 7

| | Thin film forming composition | Solid content concentration (wt %) | Composition (parts by weight) | | |
|---|---|---|---|---|---|
| | | | Crosslinking agent Aron A-30 | Dispersant WS-700 | Conductive material TC-2010 |
| Comparative Example 3-1 | c1 | 1 | 44 | 100 | 100 |
| Comparative Example 3-2 | c2 | 1 | 500 | 100 | 100 |

Example 5-1

In the dispersion 3, 100 parts by weight of the compound 1, pure water, and 2-propanol (manufactured by JUNSEI CHEMICAL CO., LTD., special grade) were mixed to prepare a thin film forming composition E1 having a solid content concentration of 1 wt %. The solvents were finally mixed at a mixing ratio of pure water:2-propanol=92:8 (weight ratio).

Examples 5-2 and 5-3

Thin film forming compositions E2 and E3 were prepared in the same manner as in Example 5-1 except that the compounding amount of the P1 polymer was changed as shown in Table 7 and the solid content concentration was adjusted to 1 wt %.

Table 8 summarizes the compositions of the thin film forming compositions E1 to E3.

TABLE 8

| | Thin film forming composition | Solid content concentration (wt %) | Composition (parts by weight) | | |
| --- | --- | --- | --- | --- | --- |
| | | | P1 polymer Compound 1 | Dispersant WS-300 | Conductive material FloTube6121 |
| Example 5-1 | E1 | 1 | 100 | 100 | 100 |
| Example 5-2 | E2 | 1 | 200 | 100 | 100 |
| Example 5-3 | E3 | 1 | 500 | 100 | 100 |

Example 6-1

In the dispersion 4, 50 parts by weight of the compound 1, pure water, and 2-propanol (manufactured by JUNSEI CHEMICAL CO., LTD., special grade) were mixed to prepare a thin film forming composition F1 having a solid content concentration of 1 wt %. The solvents were finally mixed at a mixing ratio of pure water:2-propanol=92:8 (weight ratio).

Examples 6-2 to 6-4

Thin film forming compositions F2 to F4 were prepared in the same manner as in Example 6-1 except that the compounding amount of the P1 polymer was changed as shown in Table 8, pure water and 2-propanol (manufactured by JUNSEI CHEMICAL CO., LTD., special grade) were mixed, and the solid content concentration was adjusted to 1 wt %. The solvents were finally mixed at a mixing ratio of pure water:2-propanol=92:8 (weight ratio).

Table 9 summarizes the compositions of the thin film forming compositions F1 to F3.

Example 7-1

In the dispersion 5, 100 parts by weight of the compound 3, NMP, and butyl cellosolve (manufactured by JUNSEI CHEMICAL CO., LTD., special grade) were mixed to prepare a thin film forming composition G1 having a solid content concentration of 1 wt %. The solvents were finally mixed at a mixing ratio of NMP:butyl cellosolve=80:20 (weight ratio).

Comparative Example 4-1

A thin film forming composition d1 was prepared in the same manner as in Example 7-1 except that in the dispersion 5 free of a P1 polymer, NMP and butyl cellosolve (manufactured by JUNSEI CHEMICAL CO., LTD., special grade) were mixed and the solid content concentration was adjusted to 1 wt %. The solvents were finally mixed at a mixing ratio of NMP:butyl cellosolve=80:20 (weight ratio).

Comparative Example 4-2

A thin film forming composition d2 was prepared in the same manner as in Example 7-1 except that the compound 3 was changed to ISOBAM 18 (manufactured by Kuraray Co., Ltd.) as a comparative product of the P1 polymer.

Table 10 summarizes the compositions of the thin film forming compositions G1, d1, and d2.

TABLE 9

| | Thin film forming composition | Solid content concentration (wt %) | Composition (parts by weight) | | |
| --- | --- | --- | --- | --- | --- |
| | | | P1 polymer Compound 1 | Dispersant WS-700 | Conductive material FloTube 6121 |
| Example 6-1 | F1 | 1 | 50 | 100 | 100 |
| Example 6-2 | F2 | 1 | 100 | 100 | 100 |
| Example 6-3 | F3 | 1 | 200 | 100 | 100 |
| Example 6-4 | F4 | 1 | 500 | 100 | 100 |

TABLE 10

|  | Thin film forming composition | Solid content concentration (wt %) | P1 polymer Compound 3 | Comparative product ISOBAM 18 | Dispersant PTPA | Conductive material TC-2010 |
|---|---|---|---|---|---|---|
| Example 7-1 | G1 | 1 | 100 |  | 100 | 100 |
| Comparative Example 4-1 | d1 | 1 |  |  | 100 | 100 |
| Comparative Example 4-2 | d2 | 1 |  | 100 | 100 | 100 |

Example 8-1

In the dispersion 3, 50 parts by weight of the compound 1, pure water, and 2-propanol (manufactured by JUNSEI CHEMICAL CO., LTD., special grade) were mixed to prepare a thin film forming composition H1 having a solid content concentration of 2 wt %.

Examples 8-2 to 8-4

Thin film forming compositions H2 to H4 were prepared in the same manner as in Example 8-1 except that the compounding amount of the P1 polymer was changed as shown in Table 10, pure water and 2-propanol (manufactured by JUNSEI CHEMICAL CO., LTD., special grade) were mixed, and the solid content concentration was adjusted to 2 wt %. The solvents were finally mixed at a mixing ratio of pure water:2-propanol=92:8 (weight ratio).

Table 11 summarizes the compositions of the thin film forming compositions H1 to H4.

TABLE 11

|  | Thin film forming composition | Solid content concentration (wt %) | P1 polymer Compound 1 | Dispersant WS-300 | Conductive material FloTube 6121 |
|---|---|---|---|---|---|
| Example 8-1 | H1 | 2 | 50 | 100 | 100 |
| Example 8-2 | H2 | 2 | 100 | 100 | 100 |
| Example 8-3 | H3 | 2 | 200 | 100 | 100 |
| Example 8-4 | H4 | 2 | 500 | 100 | 100 |

Example 9-1

In the dispersion 4, 50 parts by weight of the compound 1, pure water, and 2-propanol (manufactured by JUNSEI CHEMICAL CO., LTD., special grade) were mixed to prepare a thin film forming composition I1 having a solid content concentration of 2 wt %. The solvents were finally mixed at a mixing ratio of pure water:2-propanol=92:8 (weight ratio).

Examples 9-2 to 9-4

Thin film forming compositions I2 to I4 were prepared in the same manner as in Example 9-1 except that the compounding amount of the P1 polymer was changed as shown in Table 11, pure water and 2-propanol (manufactured by JUNSEI CHEMICAL CO., LTD., special grade) were mixed, and the solid content concentration was adjusted to 2 wt %. The solvents were finally mixed at a mixing ratio of pure water:2-propanol=92:8 (weight ratio).

Table 12 summarizes the compositions of the thin film forming compositions I1 to I4.

TABLE 12

| | Thin film forming composition | Solid content concentration (wt %) | Composition (parts by weight) | | |
|---|---|---|---|---|---|
| | | | P1 polymer Compound 1 | Dispersant WS-700 | Conductive material FloTube 6121 |
| Example 9-1 | I1 | 2 | 50 | 100 | 100 |
| Example 9-2 | I2 | 2 | 100 | 100 | 100 |
| Example 9-3 | I3 | 2 | 200 | 100 | 100 |
| Example 9-4 | I4 | 2 | 500 | 100 | 100 |

[1-4] Manufacture of Electrode and Evaluation of Adhesion Strength

Example 10-1

The thin film forming composition A1 was uniformly spread on a copper foil (thickness: 15 μm) as a current collector using a wire bar coater of OSP-13 and then dried at 120° C. for 20 minutes to form a thin film (undercoat layer), and thus a composite current collector was produced. The obtained composite current collector was a laminate in which the surface of the copper foil was uniformly covered with the conductive carbon material (assumed coating weight: 100 mg/m$^2$).

Here, the term "assumed coating weight" means a coating weight assumed when a thin film forming composition having a predetermined solid content concentration is applied to a current collector using a predetermined wire bar coater (the same applies hereinafter). In the present invention, the assumed coating weight in the case of using a thin film forming composition having a solid content concentration of 1 wt % is as follows.

OSP-13 (wet film thickness: 13 μm): 100 mg/m$^2$
OSP-6 (wet film thickness: 6 μm): 50 mg/m$^2$
OSP-3 (wet film thickness: 3 μm): 30 mg/m$^2$ In the case of using a thin film forming composition having a solid content concentration of 2 wt %, the assumed coating weight is as follows.

OSP-13 (wet film thickness: 13 μm): 200 mg/m$^2$

A mixture was prepared of 13.5 g of silicon (manufactured by Japan Natural Energy & Resources Co., Ltd.) as an active material, 3.6 g of polyacrylic acid (PAA, manufactured by FUJIFILM Wako Pure Chemical Corporation) as a binder, 0.9 g of acetylene black (AB, manufactured by Denka Company Limited) as a conductive additive, and 42.0 g of water using a homodisper at 3,000 rpm for 5 minutes. Next, mixing treatment was performed using a bead mill at 2,000 rpm for 30 minutes, and degassing was performed using a rotation/revolution mixer at 1,000 rpm for 2 minutes to produce an electrode slurry (solid content concentration: 30 wt %, silicon:PAA:AB=75:20:5 (weight ratio)). The obtained electrode slurry was uniformly spread on the previously produced composite current collector using a doctor blade (wet film thickness: 200 μm). Subsequently, the electrode slurry was dried at 80° C. for 30 minutes and then at 120° C. for 30 minutes to form an electrode mixture layer (dry film thickness: about 55 μm) on the composite current collector. Furthermore, the electrode mixture layer was pressed with a roll press at a press pressure of 1.2 kN/cm to produce an electrode. Table 13 shows the details.

Example 10-2

A composite current collector and an electrode were produced in the same manner as in Example 10-1 except that a wire bar coater of OSP-6 was used instead of the wire bar coater of OSP-13. Table 13 shows the details.

Example 10-3

A composite current collector and an electrode were produced in the same manner as in Example 10-1 except that a wire bar coater of OSP-3 was used instead of the wire bar coater of OSP-13. Table 13 shows the details.

Example 10-4

A composite current collector and an electrode were produced in the same manner as in Example 10-1 except that the thin film forming composition A2 was used instead of the thin film forming composition A1. Table 13 shows the details.

Example 10-5

A composite current collector and an electrode were produced in the same manner as in Example 10-4 except that a wire bar coater of OSP-6 was used instead of the wire bar coater of OSP-13. Table 13 shows the details.

Example 10-6

A composite current collector and an electrode were produced in the same manner as in Example 10-4 except that a wire bar coater of OSP-3 was used instead of the wire bar coater of OSP-13. Table 13 shows the details.

Examples 10-7 to 10-8

Composite current collectors and electrodes were produced in the same manner as in Example 10-1 except that the thin film forming compositions A3 to A4 were used respectively instead of the thin film forming composition A1. Table 13 shows the details.

Examples 11-1 to 11-2

Composite current collectors and electrodes were produced in the same manner as in Example 10-1 except that the thin film forming compositions B1 and B2 were used respectively instead of the thin film forming composition A1. Table 14 shows the details.

Example 12-1

The thin film forming composition C1 was uniformly spread on a copper foil (thickness: 15 μm) as a current collector using a wire bar coater of OSP-13 and then dried at 110° C. for 20 minutes to form a thin film (undercoat layer), and thus a composite current collector was produced. The obtained composite current collector was a laminate in which the surface of the copper foil was uniformly covered with the conductive carbon material (assumed coating weight: 100 mg/m$^2$).

Next, an electrode mixture layer was formed on the undercoat layer of the obtained composite current collector in the same procedure as in Example 10-1 to produce an electrode. Table 15 shows the details.

Comparative Examples 5-1 to 5-4

Composite current collectors and electrodes were produced in the same manner as in Example 12-1 except that the thin film forming compositions a1 to a4 were used respectively instead of the thin film forming composition C1. Table 16 shows the details.

Comparative Example 6-1

A composite current collector and an electrode were produced in the same manner as in Example 12-1 except that the thin film forming composition b1 was used instead of the thin film forming composition C1. Table 17 shows the details.

Comparative Example 6-2

A composite current collector and an electrode were produced in the same manner as in Comparative Example 6-1 except that a wire bar coater of OSP-6 was used instead of the wire bar coater of OSP-13. Table 17 shows the details.

Comparative Example 6-3

A composite current collector and an electrode were produced in the same manner as in Example 12-1 except that the thin film forming composition b2 was used instead of the thin film forming composition C1. Table 17 shows the details.

Comparative Example 6-4

A composite current collector and an electrode were produced in the same manner as in Comparative Example 6-3 except that a wire bar coater of OSP-6 was used instead of the wire bar coater of OSP-13. Table 17 shows the details.

Comparative Example 6-5

A composite current collector and an electrode were produced in the same manner as in Example 12-1 except that the thin film forming composition b3 was used instead of the thin film forming composition C1. Table 17 shows the details.

Examples 13-1 to 13-4

Composite current collectors and electrodes were produced in the same manner as in Example 12-1 except that the thin film forming compositions D1 to D4 were used respectively instead of the thin film forming composition C1. Table 18 shows the details.

Comparative Example 7-1

A composite current collector and an electrode were produced in the same manner as in Example 12-1 except that the thin film forming composition c1 was used instead of the thin film forming composition C1. Table 19 shows the details.

Comparative Example 7-2

A composite current collector and an electrode were produced in the same manner as in Example 10-1 except that the thin film forming composition c2 was used instead of the thin film forming composition A1. Table 19 shows the details.

Comparative Example 7-3

A composite current collector and an electrode were produced in the same manner as in Comparative Example 7-2 except that a wire bar coater of OSP-6 was used instead of the wire bar coater of OSP-13. Table 19 shows the details.

Examples 14-1 to 14-3

Composite current collectors and electrodes were produced in the same manner as in Example 10-1 except that the thin film forming compositions E1 to E3 were used respectively instead of the thin film forming composition A1. Table 20 shows the details.

Examples 15-1 to 15-4

Composite current collectors and electrodes were produced in the same manner as in Example 10-1 except that the thin film forming compositions F1 to F4 were used respectively instead of the thin film forming composition A1. Table 21 shows the details.

Example 16-1

A composite current collector and an electrode were produced in the same manner as in Example 10-1 except that the thin film forming composition G1 was used instead of the thin film forming composition A1. Table 22 shows the details.

Comparative Examples 8-1 to 8-2

Composite current collectors and electrodes were produced in the same manner as in Example 10-1 except that the thin film forming compositions d1 to d2 were used respectively instead of the thin film forming composition A1. Table 22 shows the details.

Examples 17-1 to 17-4

Composite current collectors and electrodes were produced in the same manner as in Example 10-1 except that the thin film forming compositions H1 to H4 were used respectively instead of the thin film forming composition A1. Table 23 shows the details.

Examples 18-1 to 18-4

Composite current collectors and electrodes were produced in the same manner as in Example 10-1 except that the thin film forming compositions I1 to I4 were used respectively instead of the thin film forming composition A1. Table 24 shows the details.

The electrode produced in each of Examples and Comparative Examples described above was cut out with a width of 25 mm, a double-sided tape with a width of 20 mm was attached to the surface coated with the electrode mixture layer, and the electrode was fixed on a glass substrate. The resulting product was fixed to an adhesion/film peeling analysis device, a peeling test was performed at a peeling angle of 90° and a peeling rate of 100 mm/min, and the adhesion strength was calculated with the following calculation formula. Tables 13 to 24 show the results.

$$\text{Adhesion strength}(N/m) = \text{measured value}(N)/(\text{sample measurement width}(mm) \times 10^{-3})$$

TABLE 13

| | Thin film forming composition | Solid content concentration (wt %) | Wire bar osp | Assumed coating weight (mg/m$^2$) | Drying temperature (° C.) | Adhesion strength (N/m) |
|---|---|---|---|---|---|---|
| Example 10-1 | A1 | 1 | 13 | 100 | 120 | 96.83 |
| Example 10-2 | A1 | 1 | 6 | 50 | 120 | 51.21 |
| Example 10-3 | A1 | 1 | 3 | 30 | 120 | 43.34 |
| Example 10-4 | A2 | 1 | 13 | 100 | 120 | 109.42 |
| Example 10-5 | A2 | 1 | 6 | 50 | 120 | 89.04 |
| Example 10-6 | A2 | 1 | 3 | 30 | 120 | 54.99 |
| Example 10-7 | A3 | 1 | 13 | 100 | 120 | 107.11 |
| Example 10-8 | A4 | 1 | 13 | 100 | 120 | 104.18 |

TABLE 14

| | Thin film forming composition | Solid content concentration (wt %) | Wire bar osp | Assumed coating weight (mg/m$^2$) | Drying temperature (° C.) | Adhesion strength (N/m) |
|---|---|---|---|---|---|---|
| Example 11-1 | B1 | 1 | 13 | 100 | 120 | 106.48 |
| Example 11-2 | B2 | 1 | 13 | 100 | 120 | 100.60 |

TABLE 15

| | Thin film forming composition | Solid content concentration (wt %) | Wire bar osp | Assumed coating weight (mg/m$^2$) | Drying temperature (° C.) | Adhesion strength (N/m) |
|---|---|---|---|---|---|---|
| Example 12-1 | C1 | 1 | 13 | 100 | 110 | 101.90 |

TABLE 16

| | Thin film forming composition | Solid content concentration (wt %) | Wire bar osp | Assumed coating weight (mg/m$^2$) | Drying temperature (° C.) | Adhesion strength (N/m) |
|---|---|---|---|---|---|---|
| Comparative Example 5-1 | a1 | 1 | 13 | 100 | 110 | 39.19 |
| Comparative Example 5-2 | a2 | 1 | 13 | 100 | 110 | 38.00 |
| Comparative Example 5-3 | a3 | 1 | 13 | 100 | 110 | 44.11 |
| Comparative Example 5-4 | a4 | 1 | 13 | 100 | 110 | 50.63 |

TABLE 17

| | Thin film forming composition | Solid content concentration (wt %) | Wire bar osp | Assumed coating weight (mg/m$^2$) | Drying temperature (° C.) | Adhesion strength (N/m) |
|---|---|---|---|---|---|---|
| Comparative Example 6-1 | b1 | 1 | 13 | 100 | 110 | 51.60 |
| Comparative Example 6-2 | b1 | 1 | 6 | 50 | 120 | 49.04 |
| Comparative Example 6-3 | b2 | 1 | 13 | 100 | 120 | 54.83 |

TABLE 17-continued

|  | Thin film forming composition | Solid content concentration (wt %) | Wire bar osp | Assumed coating weight (mg/m²) | Drying temperature (° C.) | Adhesion strength (N/m) |
| --- | --- | --- | --- | --- | --- | --- |
| Comparative Example 6-4 | b2 | 1 | 6 | 50 | 120 | 57.67 |
| Comparative Example 6-5 | b3 | 1 | 13 | 100 | 120 | 56.96 |

TABLE 18

|  | Thin film forming composition | Solid content concentration (wt %) | Wire bar osp | Assumed coating weight (mg/m²) | Drying temperature (° C.) | Adhesion strength (N/m) |
| --- | --- | --- | --- | --- | --- | --- |
| Example 13-1 | D1 | 1 | 13 | 100 | 110 | 116.81 |
| Example 13-2 | D2 | 1 | 13 | 100 | 110 | 118.39 |
| Example 13-3 | D3 | 1 | 13 | 100 | 110 | 116.11 |
| Example 13-4 | D4 | 1 | 13 | 100 | 110 | 92.67 |

TABLE 19

|  | Thin film forming composition | Solid content concentration (wt %) | Wire bar osp | Assumed coating weight (mg/m²) | Drying temperature (° C.) | Adhesion strength (N/m) |
| --- | --- | --- | --- | --- | --- | --- |
| Comparative Example 7-1 | c1 | 1 | 13 | 100 | 110 | 86.09 |
| Comparative Example 7-2 | c2 | 1 | 13 | 100 | 120 | 62.29 |
| Comparative Example 7-3 | c2 | 1 | 6 | 50 | 120 | 51.59 |

TABLE 20

|  | Thin film forming composition | Solid content concentration (wt %) | Wire bar osp | Assumed coating weight (mg/m²) | Drying temperature (° C.) | Adhesion strength (N/m) |
| --- | --- | --- | --- | --- | --- | --- |
| Example 14-1 | E1 | 1 | 13 | 100 | 120 | 92.71 |
| Example 14-2 | E2 | 1 | 13 | 100 | 120 | 119.18 |
| Example 14-3 | E3 | 1 | 13 | 100 | 120 | 128.58 |

TABLE 21

|  | Thin film forming composition | Solid content concentration (wt %) | Wire bar osp | Assumed coating weight (mg/m²) | Drying temperature (° C.) | Adhesion strength (N/m) |
| --- | --- | --- | --- | --- | --- | --- |
| Example 15-1 | F1 | 1 | 13 | 100 | 120 | 103.11 |
| Example 15-2 | F2 | 1 | 13 | 100 | 120 | 114.68 |
| Example 15-3 | F3 | 1 | 13 | 100 | 120 | 120.78 |
| Example 15-4 | F4 | 1 | 13 | 100 | 120 | 128.10 |

TABLE 22

| | Thin film forming composition | Solid content concentration (wt %) | Wire bar osp | Assumed coating weight (mg/m²) | Drying temperature (° C.) | Adhesion strength (N/m) |
|---|---|---|---|---|---|---|
| Example 16-1 | G1 | 1 | 13 | 100 | 120 | 125.83 |
| Comparative Example 8-1 | d1 | 1 | 13 | 100 | 120 | 19.97 |
| Comparative Example 8-2 | d2 | 1 | 13 | 100 | 120 | 37.90 |

TABLE 23

| | Thin film forming composition | Solid content concentration (wt %) | Wire bar osp | Assumed coating weight (mg/m²) | Drying temperature (° C.) | Adhesion strength (N/m) |
|---|---|---|---|---|---|---|
| Example 17-1 | H1 | 2 | 13 | 200 | 120 | 60.55 |
| Example 17-2 | H2 | 2 | 13 | 200 | 120 | 139.42 |
| Example 17-3 | H3 | 2 | 13 | 200 | 120 | 118.64 |
| Example 17-4 | H4 | 2 | 13 | 200 | 120 | 110.18 |

TABLE 24

| | Thin film forming composition | Solid content concentration (wt %) | Wire bar osp | Assumed coating weight (mg/m²) | Drying temperature (° C.) | Adhesion strength (N/m) |
|---|---|---|---|---|---|---|
| Example 18-1 | I1 | 2 | 13 | 200 | 120 | 127.85 |
| Example 18-2 | I2 | 2 | 13 | 200 | 120 | 140.33 |
| Example 18-3 | I3 | 2 | 13 | 200 | 120 | 135.57 |
| Example 18-4 | I4 | 2 | 13 | 200 | 120 | 148.06 |

From the results in Tables 13 to 24, it has been confirmed that the adhesion strength between the current collector and the electrode mixture layer is improved by forming the undercoat layer on the current collector using the composition according to the present invention.

[1-5] Manufacture of Battery and Evaluation of Characteristics

Example 19-1

A mixture was prepared of 6.92 g of silicon monoxide (SiO, manufactured by OSAKA Titanium technologies Co., Ltd.) as an active material, 16.15 g of graphite (CGB-10, manufactured by Nippon Graphite Group), 7.96 g of lithium polyacrylate (PAALi) as a binder, 1.59 g of acetylene black (AB, manufactured by Denka Company Limited) as a conductive additive, 1.06 g of a carbon nanotube (VGCF, manufactured by Showa Denko K.K.), and 26.32 g of water using a homodisper at 8,000 rpm for 5 minutes. Next, mixing treatment was performed using a thin-film spin-type high-speed mixer at a peripheral speed of 20 m/sec for 60 seconds, and degassing was performed using a rotation/revolution mixer at 1,000 rpm for 2 minutes to prepare an electrode slurry (solid content concentration: 44 wt %, SiO:CGB-10:PAALi:AB:VGCF=26.1:60.9:3.0:6.0:4.0 (weight ratio)). The obtained electrode slurry was spread on the composite current collector obtained in Example 10-4 using an applicator (wet film thickness: 90 µm). Subsequently, the electrode slurry was dried at 80° C. for 30 minutes and then at 120° C. for 30 minutes to form an electrode mixture layer (dry film thickness: about 45 µm) on the undercoat layer. Furthermore, the electrode mixture layer was pressed with a roll press at a press pressure of 0.125 kN/cm to produce an electrode.

From the electrode produced above, 3 sheets were punched out, the electrode mixture layer at a portion to be a tab-welded portion was peeled off, and thus 3 sheets were each formed into a rectangular shape having a length of 4.4 cm and a width of 5.4 cm. A Ni+Cu tab with a sealant was ultrasonically welded to the electrode under the conditions of an amplitude of 80% and a pressure of 0.2 MPa. An Al tab with a sealant was ultrasonically welded similarly to a positive electrode (lithium cobalt oxide (LCO):acetylene black (AB):polyvinylidene fluoride (PVdF)=94.3:2.8:2.8 (weight ratio), coating weight: 16.5 mg/m²) as a counter electrode under the conditions of an amplitude of 40% and a pressure of 0.2 MPa to obtain a rectangular positive electrode having a length of 4.0 cm and a width of 5.0 cm. The resulting product was vacuum-dried at 120° C. for 15 hours and transferred to a dry booth. The positive electrode was placed on a laminate film, and a separator (Celgard #2400 manufactured by Celgard LLC.) and the electrode D were stacked on the positive electrode and fixed with an imide tape. The laminate cell was sealed excluding a part to be an injection port of an electrolyte solution. After injecting 300 µL of an electrolyte solution (manufactured by KISHIDA CHEMICAL Co., Ltd., ethylene carbonate:ethyl methyl carbonate=1:3 (v/v %), containing 1.0 mol/L of lithium hexafluorophosphate as an electrolyte and 2 wt % of vinylene carbonate as an additive), the laminate cell was vacuum-sealed. Thereafter, the laminate cell was allowed to stand for 5 hours, and thus three test secondary batteries were produced.

Examples 19-2 to 19-6

Three test secondary batteries were produced in the same manner as in Example 19-1 except that the composite current collector obtained in Example 10-8, 13-4, 14-1, 14-3, or 15-2 was used as the current collector.

Comparative Example 9-1

Three test secondary batteries were produced in the same manner as in Example 19-1 except that the composite current collector obtained in Comparative Example 7-1 was used as the current collector.

The characteristics of the secondary batteries produced in Examples 19-1 to 19-5 and Comparative Example 9-1 were evaluated. For the purpose of evaluating the influence of the composite current collector in the negative electrode on the battery, a charge and discharge test was performed under the conditions shown in Table 25 in the order of aging and cycle characteristics evaluation of the battery using a charge/discharge measurement device. Table 26 shows the obtained results.

TABLE 25

| Step | 1<br>Aging | 2<br>Cycle test |
|---|---|---|
| Charge condition (C) | 0.1 | 1 |
| Discharge condition (C) | 0.1 | 1 |
| Cut-off voltage (V) | 2.85-4.20 | |
| Cycle number | 5 | 100 |

TABLE 26

| | Composite current collector | Thin film forming composition | Capacity retention rate (%) 1 C, 100 cycles |
|---|---|---|---|
| Example 19-1 | Example 10-4 | A2 | 73 |
| Example 19-2 | Example 10-8 | A4 | 75 |
| Example 19-3 | Example 13-4 | D4 | 75 |
| Example 19-4 | Example 14-1 | E1 | 80 |
| Example 19-5 | Example 14-3 | E3 | 79 |
| Example 19-6 | Example 15-2 | F2 | 79 |
| Comparative Example 9-1 | Comparative Example 7-1 | c1 | 67 |

From the results in Table 26, it has been confirmed that the secondary battery using the composite current collector having a high adhesion strength between the current collector and the electrode mixture layer has excellent cycle characteristics.

[2-1] Synthesis of P1 Polymer-2

[Synthesis Example 4] Synthesis of Compound 4

In a 200 mL four-necked flask, 4.48 g (52.0 mmol) of methacrylic acid (manufactured by JUNSEI CHEMICAL CO., LTD.), 10.0 g (63.6 mmol) of dimethylaminoethyl methacrylate, and 0.012 g (0.038 mmol) of VE-073 (manufactured by FUJIFILM Wako Pure Chemical Corporation) as an initiator were dissolved in 82.12 g of ethanol (manufactured by JUNSEI CHEMICAL CO., LTD.). The inside of the system was replaced with a nitrogen gas, then the internal temperature was raised to 80° C., and the solution was heated and stirred for 5 hours. The reaction solution was cooled and added dropwise to 500 g of hexane, and the generated sediment was filtered off. The obtained residue was dispersed in 100 g of ethanol again and added dropwise to 500 g of hexane (manufactured by JUNSEI CHEMICAL CO., LTD.). The generated sediment was filtered off, and then the obtained residue was dried under reduced pressure at 60° C. for 6 hours to obtain a white compound 4 (yield amount: 6.53 g, yield rate: 45.0%). The Mw of the obtained P1 polymer was $1.45 \times 10^5$ (as a sodium polystyrene sulfonate-equivalent value).

[Synthesis Example 5] Synthesis of Compound 5

A compound 5 was synthesized in the same manner as in Synthesis Example 4 except that the amount of methacrylic acid was changed to 2.35 g (27.0 mmol) and the amount of dimethylaminoethyl methacrylate was changed to 10.00 g (64.0 mmol).

[Synthesis Example 6] Synthesis of Compound 6

A compound 6 was synthesized in the same manner as in Synthesis Example 4 except that the amount of methacrylic acid was changed to 7.67 g (89.0 mmol) and the amount of dimethylaminoethyl methacrylate was changed to 6.00 g (38.0 mmol).

[2-2] Preparation of Thin Film Forming Composition-2

Examples 20-1 and 20-2

Thin film forming compositions J1 and J2 were prepared in the same manner as in Example 5-1 except that the kind and the compounding amount of the P1 polymer were changed as shown in Table 27 and the solid content concentration was adjusted to 1 wt %. Both of the thin film forming compositions J1 and J2 were a black ink in which the CNT was uniformly dispersed.

Table 27 summarizes the compositions of the thin film forming compositions J1 and J2.

TABLE 27

| | Thin film forming composition | Solid content concentration (wt %) | Composition (parts by weight) | | |
|---|---|---|---|---|---|
| | | | P1 polymer Compound 4 | Dispersant WS-300 | Conductive material FloTube 6121 |
| Example 20-1 | J1 | 1 | 200 | 100 | 100 |
| Example 20-2 | J2 | 1 | 500 | 100 | 100 |

Examples 21-1 and 21-2

Thin film forming compositions K1 and K2 were prepared in the same manner as in Example 5-1 except that the kind and the compounding amount of the P1 polymer were changed as shown in Table 28 and the solid content concentration was adjusted to 1 wt %. Both of the thin film forming compositions K1 and K2 were a black ink in which the CNT was uniformly dispersed.

Table 28 summarizes the compositions of the thin film forming compositions K1 and K2.

TABLE 28

| | Thin film forming composition | Solid content concentration (wt %) | Composition (parts by weight) | | |
|---|---|---|---|---|---|
| | | | P1 polymer Compound 5 | Dispersant WS-300 | Conductive material FloTube6121 |
| Example 21-1 | K1 | 1 | 200 | 100 | 100 |
| Example 21-2 | K2 | 1 | 500 | 100 | 100 |

Example 22-1

A thin film forming composition L1 was prepared in the same manner as in Example 5-1 except that the kind and the compounding amount of the P1 polymer were changed as shown in Table 29 and the solid content concentration was adjusted to 1 wt %. The thin film forming composition L1 was a black ink in which the CNT was uniformly dispersed.

Table 29 summarizes the composition of the thin film forming composition L1.

TABLE 29

| | Thin film forming composition | Solid content concentration (wt %) | Composition (parts by weight) | | |
|---|---|---|---|---|---|
| | | | P1 polymer Compound 6 | Dispersant WS-300 | Conductive material FloTube 6121 |
| Example 22-1 | L1 | 1 | 500 | 100 | 100 |

[2-3] Manufacture of Electrode and Evaluation of Adhesion Strength-2

Example 23-1

A composite current collector and an electrode were produced in the same manner as in Example 10-1 except that the thin film forming composition J1 was used instead of the thin film forming composition A1. Table 30 shows the details.

Example 23-2

A composite current collector and an electrode were produced in the same manner as in Example 23-1 except that a wire bar coater of OSP-6 was used instead of the wire bar coater of OSP-13. Table 30 shows the details.

Example 23-3

A composite current collector and an electrode were produced in the same manner as in Example 10-1 except that the thin film forming composition J2 was used instead of the thin film forming composition A1. Table 30 shows the details.

Example 23-4

A composite current collector and an electrode were produced in the same manner as in Example 23-3 except that a wire bar coater of OSP-6 was used instead of the wire bar coater of OSP-13. Table 30 shows the details.

Examples 24-1 and 24-2

Composite current collectors and electrodes were produced in the same manner as in Example 10-2 except that the thin film forming compositions K1 and K2 were used respectively instead of the thin film forming composition A1. Table 31 shows the details.

Example 25-1

A composite current collector and an electrode were produced in the same manner as in Example 10-1 except that the thin film forming composition L1 was used instead of the thin film forming composition A1. Table 32 shows the details.

Example 25-2

A composite current collector and an electrode were produced in the same manner as in Example 25-1 except that a wire bar coater of OSP-6 was used instead of the wire bar coater of OSP-13. Table 32 shows the details.

The electrodes produced in Examples described above were subjected to a peeling test in the same procedure as the procedure described in [1-4] above to calculate the adhesion strength. Tables 30 to 32 show the results.

TABLE 30

| | Thin film forming composition | Solid content concentration (wt %) | Wire bar osp | Assumed coating weight (mg/m$^2$) | Drying temperature (° C.) | Adhesion strength (N/m) |
|---|---|---|---|---|---|---|
| Example 23-1 | J1 | 1 | 13 | 100 | 120 | 114.64 |
| Example 23-2 | J1 | 1 | 6 | 50 | 120 | 99.73 |
| Example 23-3 | J2 | 1 | 13 | 100 | 120 | 138.87 |
| Example 23-4 | J2 | 1 | 6 | 50 | 120 | 134.60 |

TABLE 31

| | Thin film forming composition | Solid content concentration (wt %) | Wire bar osp | Assumed coating weight (mg/m$^2$) | Drying temperature (° C.) | Adhesion strength (N/m) |
|---|---|---|---|---|---|---|
| Example 24-1 | K1 | 1 | 6 | 50 | 120 | 97.03 |
| Example 24-2 | K2 | 1 | 6 | 50 | 120 | 129.60 |

TABLE 32

| | Thin film forming composition | Solid content concentration (wt %) | Wire bar osp | Assumed coating weight (mg/m$^2$) | Drying temperature (° C.) | Adhesion strength (N/m) |
|---|---|---|---|---|---|---|
| Example 25-1 | L1 | 1 | 13 | 100 | 120 | 105.38 |
| Example 25-2 | L1 | 1 | 6 | 50 | 120 | 114.65 |

[2-4] Manufacture of Battery and Evaluation of Characteristics-2

Example 26-1

Three test secondary batteries were produced in the same manner as in Example 19-1 except that the composite current collector obtained in Example 23-1 was used as the current collector.

The characteristics of the secondary batteries produced in Example 26-1 were evaluated. For the purpose of evaluating the influence of the composite current collector in the negative electrode on the battery, a charge and discharge test was performed under the conditions shown in Table 25 in the order of aging and cycle characteristics evaluation of the battery using a charge/discharge measurement device. Table 33 shows the obtained results.

TABLE 33

| | Composite current collector | Thin film forming composition | Capacity retention rate (%) 1 C, 100 cycles |
|---|---|---|---|
| Example 26-1 | Example 23-1 | J1 | 87 |

[3-1] Manufacture of Electrode and Evaluation of Adhesion Strength-3

Example 27-1

The thin film forming composition J1 was uniformly spread on a SUS foil (thickness: 15 μm) as a current collector using a wire bar coater of OSP-13 and then dried at 120° C. for 20 minutes to form a thin film (undercoat layer), and thus a composite current collector was produced. The obtained composite current collector was a laminate in which the surface of the SUS foil was uniformly covered with the conductive carbon material (assumed coating weight: 100 mg/m$^2$).

Next, an electrode mixture layer was formed on the undercoat layer of the obtained composite current collector in the same procedure as in Example 10-1 to produce an electrode. Table 34 shows the details.

Comparative Example 10-1

An electrode was produced in the same manner as in Example 27-1 except that a pure SUS foil (thickness: 15 μm) was used as the composite current collector. Table 34 shows the details.

TABLE 34

| | Thin film forming composition | Current collector | Solid content concentration (wt %) | Wire bar osp | Assumed coating weight (mg/m$^2$) | Drying temperature (° C.) | Adhesion strength (N/m) |
|---|---|---|---|---|---|---|---|
| Example 27-1 | J1 | SUS | 1 | 13 | 100 | 120 | 50.83 |
| Comparative Example 10-1 | none | SUS | — | — | — | — | 31.70 |

The invention claimed is:

1. A thin film forming composition for energy storage device electrodes, comprising: a conductive carbon material; a dispersant; a solvent; and a polymer having a pendant chain having a partial structure of formula (P1) described below:

[Chem. 1]

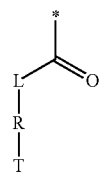
(P1)

wherein L represents —O— or —NH—, R represents an alkylene group having 1 to 20 carbon atoms, T represents a substituted or unsubstituted amino group, a nitrogen-containing heteroaryl group having 2 to 20 carbon atoms, or a nitrogen-containing aliphatic heterocyclic group having 2 to 20 carbon atoms, and * represents a bonding site.

2. The thin film forming composition for energy storage device electrodes of claim 1, wherein the partial structure of formula (P1) has any one of formulas (P1-1) to (P1-3) described below:

[Chem. 2]

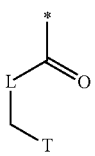
(P1-1)

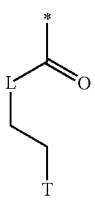
(P1-2)

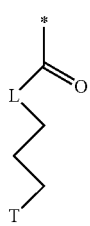
(P1-3)

wherein L, T, and * are as described above.

3. The thin film forming composition for energy storage device electrodes of claim 2, wherein the partial structure of formula (P1) has any one of formulas (P2-1) to (P2-3) described below:

[Chem. 3]

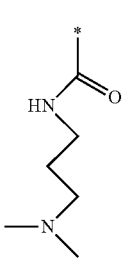
(P2-1)

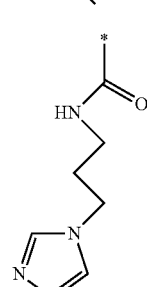
(P2-2)

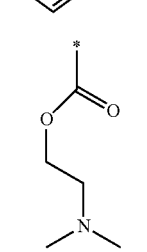
(P2-3)

wherein * is as described above.

4. The thin film forming composition for energy storage device electrodes of claim 1, wherein the polymer includes repeating units of formula (C1-1) or (C1-2) described below:

[Chem. 4]

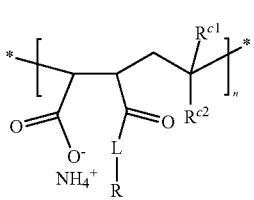
(C1-1)

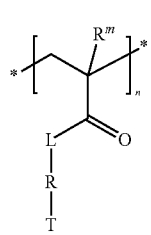
(C1-2)

wherein $R^{c1}$ and $R^{c2}$ each independently represent a hydrogen atom or an alkyl group having 1 to 20 carbon atoms, $R^m$ represents a hydrogen atom or a methyl group, n represents a natural number, and L, R, T, and * are as described above.

5. The thin film forming composition for energy storage device electrodes of claim 1, wherein the solvent includes one or more selected from the group consisting of water and hydrophilic solvents.

6. The thin film forming composition for energy storage device electrodes of claim 1, wherein the dispersant includes a pendant oxazoline group-containing polymer or a triarylamine-based highly branched polymer.

7. The thin film forming composition for energy storage device electrodes of claim 1, further comprising a crosslinking agent.

8. An undercoat layer comprising a thin film obtained from the thin film forming composition for energy storage device electrodes of claim 1.

9. A composite current collector for energy storage device electrodes, comprising the undercoat layer of claim 8.

10. An electrode for energy storage devices, comprising the composite current collector for energy storage device electrodes of claim 9.

11. An energy storage device comprising the electrode for energy storage devices of claim 10.

12. The energy storage device of claim 11, being a lithium ion battery.

* * * * *